(12) United States Patent
Zhan et al.

(10) Patent No.: US 8,311,653 B2
(45) Date of Patent: Nov. 13, 2012

(54) APPARATUS AND METHOD FOR SYSTEM IDENTIFICATION AND LOOP-SHAPING CONTROLLER DESIGN IN A PROCESS CONTROL SYSTEM

(75) Inventors: Charles Q. Zhan, Chandler, AZ (US); Sachindra K. Dash, Scottsdale, AZ (US); J. Ward MacArthur, Scottsdale, AZ (US); Konstantinos Tsakalis, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 532 days.

(21) Appl. No.: 12/028,208

(22) Filed: Feb. 8, 2008

(65) Prior Publication Data

US 2009/0204233 A1 Aug. 13, 2009

(51) Int. Cl.
*G05B 13/02* (2006.01)
*A01B 69/00* (2006.01)

(52) U.S. Cl. ........... 700/29; 700/30; 700/31; 700/33; 700/34; 700/36; 700/44; 700/531; 701/41

(58) Field of Classification Search ............. 700/29–31, 700/33–34, 36, 44, 53; 701/41
See application file for complete search history.

(56) References Cited

U.S. PATENT DOCUMENTS

| | | | | |
|---|---|---|---|---|
| 5,121,332 | A * | 6/1992 | Balakrishnan et al. | 700/127 |
| 5,726,879 | A * | 3/1998 | Sato | 700/56 |
| 6,940,680 | B2 * | 9/2005 | Iwashiro | 360/77.07 |
| 2002/0024899 | A1 * | 2/2002 | Cho et al. | 369/44.32 |
| 2003/0158610 | A1 * | 8/2003 | Jamal-Ahmad | 700/28 |
| 2004/0225383 | A1 * | 11/2004 | Tsai et al. | 700/29 |
| 2005/0131592 | A1 * | 6/2005 | Chiang | 701/13 |
| 2005/0267606 | A1 * | 12/2005 | Bartlett et al. | 700/29 |
| 2008/0051704 | A1 * | 2/2008 | Patel et al. | 604/95.05 |
| 2008/0300807 | A1 * | 12/2008 | Marti et al. | 702/66 |

OTHER PUBLICATIONS

McFarlane, D. et al., "Robust stabilization of a flexible space platform: an H∞ coprime factor approach", Apr. 1988, Control, 1988. Control 88., International Conference on, pp. 677-682.*
McFarlane, Duncan et al., "Reduced-Order Controller Design Using Coprime Factor Model Reduction", Mar. 1990, IEEE Transactions on Automatic Control, vol. 35, No. 3, pp. 369-373.*
Van den Hof et al., "Identification of normalized coprime plant factors for iterative model and controller enhancement", IEEE Proceedings of the 32nd Conference on Decision and Control, Dec. 1993.*
Van den Hof, "Closed-loop issues in system identification", Annual Reviews in Control 22, 1998.*

(Continued)

*Primary Examiner* — Ryan Jarrett
*Assistant Examiner* — Jason Lin

(57) ABSTRACT

One method includes obtaining a preliminary model associated with a system to be controlled and constructing a weighted model using one or more weighting factors. The method also includes identifying a final model of the system using the preliminary and weighted models, where the final model has a stability margin that is greater than an uncertainty associated with the final model. The method further includes controlling the system using a controller designed based on the final model. Another method includes identifying a first model associated with a system to be controlled, performing model order reduction to identify a second model, and controlling the system using a controller designed based on the second model. Performing the model order reduction includes reducing a weighted coprime factor model uncertainty between the first and second models.

21 Claims, 17 Drawing Sheets

OTHER PUBLICATIONS

Galdos et al., Robust Loop Shaping Controller Design for Spectral Models by Quadratic Programming, 2007, Swiss Federal Institute of Technology Lausanne, Automatic Control Laboratory Control and Decision Conference 2007, pp. 1-20.*

Charles Q. Zhan, et al., "System Identification for Robust Control", IEEE Proceedings of the 2007 American Control Conference, Marriott Marquis Hotel at Times Square, New York City, USA, Jul. 11-13, 2007, p. 846-851.

Charles Q. Zhan, et al., "A new robust-control-oriented system identification method", Proceedings of the 17th World Congress, The International Federation of Automatic Control, Seoul, Korea, Jul. 6-11, 2008, p. 12371-12376.

Kostas S. Tsakalis, et al., "Adaptive PID Control using Filter-Banks and Frequency Loop Shaping", 8 pages.

Elena Grassi, et al., "Adaptive/Self-Tuning PID Control by Frequency Loop-Shaping", Proceedings of the 39th IEEE Conference on Decision and Control, Sydney, Australia, Dec. 2000, p. 1099-1101.

D.C. McFarlane, et al., "Robust Controller Design Using Normalized Coprime Factor Plant Descriptions", 1990, 3 pages.

Glenn Vinnicombe, "Uncertainty and Feedback", 2001, 4 pages.

Masami Saeki, et al., "PID gain tuning based on falsification using bandpass filters", SICE-ICASE International Joint Conference 2006, Oct. 18-21, 2006, Bexco, Busan, Korea, p. 4032-4037.

Tong Zhou, "Frequency Response Estimation for NCFs of an MIMO Plant From Closed-Loop Time-Domain Experimental Data", IEEE Transactions on Automatic Control, vol. 51, No. 1, Jan. 2006, p. 38-51.

Guoxiang Gu, "Modeling of Normalized Coprime Factors with v-Metric Uncertainty", IEEE Transactions on Automatic Control, vol. 44, No. 8, Aug. 1999, p. 1498-1511.

Michael G. Safonov, et al., "The Unfalsified Control Concept and Learning", IEEE Transactions on Automatic Control, vol. 42, No. 6, Jun. 1997, p. 843-847.

Lennart Ljung, et al., "Asymptotic Properties of Black-Box Identification of Transfer Functions", IEEE Transactions on Automatic Control, vol. AC-30, No. 6, Jun. 1985, p. 514-530.

Daniel E. Rivera, et al., "Control-Relevant Prefiltering: a Systematic Design Approach and Case Study", IEEE Transactions on Automatic Control, vol. 37, No. 7, Jul. 1992, p. 964-974.

Ruud J.P. Schrama, "Accurate Identification for Control: The Necessity of an Iterative Scheme", IEEE Transactions on Automatic Control, vol. 37, No. 7, Jul. 1992, p. 991-994.

Paul M.J. Van Den Hof, et al., "Identification and Control-Closed-loop Issues", Automatica, 1995, vol. 31, No. 12, p. 1751-1770.

Duncan McFarlane, et al., "A Loop Shaping Design Procedure Using H∞ Synthesis", IEEE Transactions on Automatic Control, vol. 37, No. 6, Jun. 1992, p. 759-769.

Wolfgang Reinelt, et al., "Comparing different approaches to model error modeling in robust identification", Automatica, vol. 38, (2002), p. 787-803.

X. Bombois, et al., "Robustness analysis tools for an uncertainly set obtained by prediction error identification", Automatica, vol. 37, (2001), p. 1629-1636.

P. Date, et al., "Algorithms for worst case identification in H∞ and in the v-gap metric", Automatica, vol. 40, (2004), p. 995-1002.

Tryphon T. Georgiou, "On the computation of the gap metric", Systems & Controls, vol. 11, (1988), p. 253-257.

Michel Gevers, et al., "Model validation for control and controller validation in a prediction error identification framework-Part I: theory", Automatica, vol. 39, (2003), p. 403-415.

Michel Gevers, et al., "Model validation for control and controller validation in a prediction error identification framework-Part II: illustrations", Automatica, vol. 39, (2003), p. 417-427.

Robert L. Kosut, "Uncertainty Model Unfalsification: A System Identification Paradigm Compatible with Robust Control Design", IEEE Proceedings of the 34th Conference on Decision & Control, New Orleans, LA, Dec. 1995, p. 3492-3497.

Kostas Tsakalis, et al., "Loop-Shaping Controller Design From Input-Output Data: Application to a Paper Machine Simulator", IEEE Transactions on Control Systems Technology, vol. 10, No. 1, Jan. 2002, p. 127-136.

Herbert J.A.F. Tulleken, "Generalized Binary Noise Test-signal Concept for Improved Identification-experiment Design", Automatica, vol. 26, No. 1, 1990, p. 37-49.

P. Date, et al., "An Algorithm for Identification in the v-gap metric", IEEE Proceedings of the 38th Conference on Decision & Control, Phoenix, Arizona, Dec. 1999, p. 3230-3235.

Charles Zhan, et al., "System Identification for Robust Control", ACC 2007, 17 pages.

Charles Zhan, PhD Comprehensive Examination Presentation on "System Identification for Robust Control" Mar. 16, 2007, 49 pages.

* cited by examiner

APPARATUS AND METHOD FOR SYSTEM IDENTIFICATION AND LOOP-SHAPING CONTROLLER DESIGN IN A PROCESS CONTROL SYSTEM

TECHNICAL FIELD

This disclosure relates generally to control systems and more specifically to an apparatus and method for system identification and loop-shaping controller design in a process control system.

BACKGROUND

Processing facilities are often managed using process control systems. Example processing facilities include manufacturing plants, chemical plants, crude oil refineries, ore processing plants, and paper or pulp manufacturing and processing plants. Among other operations, process control systems typically manage the use of motors, valves, and other industrial equipment in the processing facilities.

In conventional process control systems, controllers are often used to control the operation of the industrial equipment in the processing facilities. The controllers could, for example, monitor the operation of the industrial equipment, provide control signals to the industrial equipment, and generate alarms when malfunctions are detected.

One example of a conventional controller is the Proportional-Integral-Derivative (PID) controller, which is very common in industrial control systems. These types of controllers are often "tuned" or adjusted during operation, which typically involves altering parameters of the controllers to ensure more reliable or accurate operations. Conventional controllers also typically operate using models of the processes being controlled. The models allow the controllers to determine, based on input signals from sensors or other data, how to control the industrial equipment. For long-term and successful control of an industrial process, it is often necessary to perform "system identification" in order to generate an accurate model of the process.

SUMMARY

This disclosure provides an apparatus and method for system identification and loop-shaping controller design in a process control system.

In a first embodiment, a method includes obtaining a preliminary model associated with a system to be controlled. The method also includes constructing a weighted model using one or more weighting factors. The method further includes identifying a final model of the system using the preliminary and weighted models, where the final model has a stability margin that is greater than an uncertainty associated with the final model. In addition, the method includes controlling the system using a controller designed based on the final model.

In particular embodiments, identifying the final model includes determining a coprime factorization of the preliminary model and a normalized coprime factorization of the weighted model. It also includes determining one or more parameters associated with the final model using the coprime factorizations, where the one or more parameters are determined so that the final model has a reduced weighted coprime uncertainty. Determining the one or more parameters could include minimizing a maximum power spectrum of a time-domain signal in a frequency interval over multiple intervals. A power spectrum of the time-domain signal may be estimated using a bank of bandpass filters.

In other particular embodiments, determining the one or more parameters includes solving a linear matrix inequality problem iteratively, where each of multiple iterations includes identifying the one or more parameters of the final model. Each iteration is associated with a weighted coprime uncertainty value determined using the bank of bandpass filters. Also, the iterations may stop when a difference between the weighted coprime uncertainty values for two consecutive iterations is within a threshold value.

In yet other particular embodiments, the method also includes receiving data identifying one or more inputs to the system and one or more outputs from the system, where the data is used to identify the models. Also, the controller can be designed by performing loop-shaping controller design.

In a second embodiment, an apparatus includes a memory configured to store data associated with a system to be controlled. The apparatus also includes a processor configured to obtain a preliminary model associated with the system and construct a weighted model using one or more weighting factors. The processor is also configured to identify a final model of the system using the preliminary and weighted models, where the final model has a stability margin that is greater than an uncertainty associated with the final model. In addition, the processor is configured to design a controller for controlling the system based on the final model.

In a third embodiment, a method includes identifying a first model associated with a system to be controlled, performing model order reduction to identify a second model, and controlling the system using a controller designed based on the second model. Performing the model order reduction includes reducing a weighted coprime factor model uncertainty between the first and second models.

In particular embodiments, performing the model order reduction includes minimizing the weighted coprime factor model uncertainty between the first and second models.

In other particular embodiments, performing the model order reduction includes constructing a weighted model using one or more weighting factors. It also includes identifying the second model using the first model and the weighted model, where the second model has a lower order than the first model. It further includes determining that the second model has a stability margin that is greater than an uncertainty associated with the second model.

In yet other particular embodiments, the method also includes identifying the one or more weighting factors. The one or more weighting factors could be identified by selecting one or more values for one or more tunable parameters in each weighting factor, where the one or more values are selected to satisfy both controller performance and controller robustness requirements.

In still other particular embodiments, the method also includes generating an input sequence for the first model and generating an output sequence based on the input sequence using the first model. The second model is identified using the input sequence and the output sequence. In yet other particular embodiments, identifying the first model includes identifying an auto-regression with exogenous input (ARX) model.

In a fourth embodiment, an apparatus includes a memory configured to store data associated with a system to be controlled. The apparatus also includes a processor configured to identify a first model associated with the system, perform model order reduction to identify a second model, and design a controller for controlling the system based on the second model. The second model has a smaller weighted coprime factor model uncertainty than the first model.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 22, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
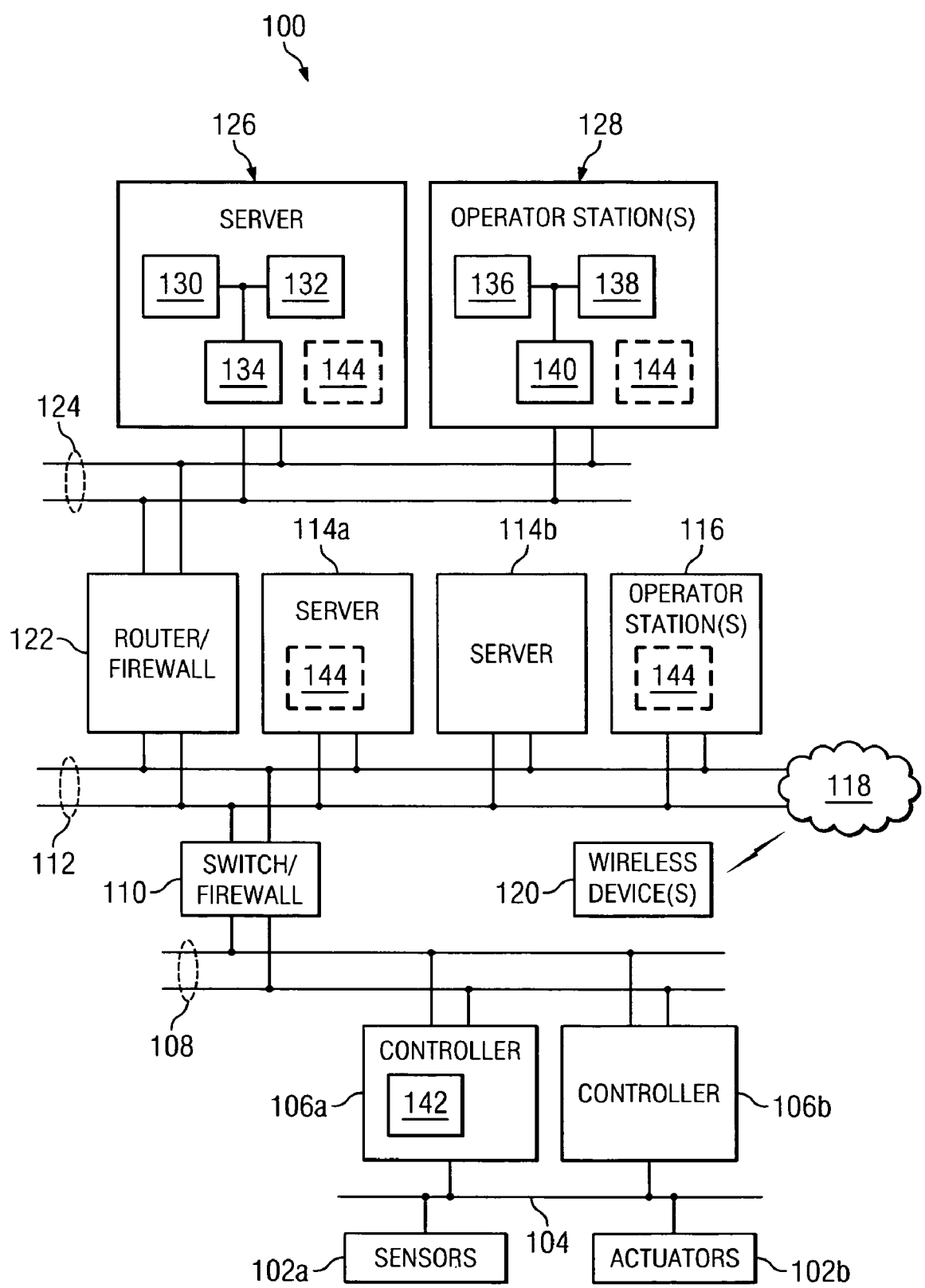
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various process elements that facilitate the manufacture or processing of at least one material. The process control system 100 could represent any suitable system for producing or processing one or more materials, such as an oil and gas refinery or a pulp/paper system. These or other industries are often characterized by vastly different processes having different response characteristics that can range from sub-seconds (such as pressure driven hydraulic loops) to days (such as high purity distillation). Also, these or other industries typically have processes that are, in general, non-stationary because of drift and disturbances with broad power spectrum. In addition, these or other industries typically involve processes that suffer from unmeasurable disturbances and/or sensor/feedback noise.

As shown in FIG. 1, the process elements include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system, such as heaters, motors, catalytic crackers, or valves. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

Two controllers 106a-106b are coupled to the network 104. The controllers 106a-106b may, among other things, use the measurements from the sensors 102a to control the operation of the actuators 102b. For example, the controllers 106a-106b could receive measurement data from the sensors 102a and use the measurement data to generate control signals for the actuators 102b. Each of the controllers 106a-106b includes any hardware, software, firmware, or combination thereof for interacting with the sensors 102a and controlling the actuators 102b. The controllers 106a-106b could, for example, represent multivariable controllers or other types of controllers. As a particular example, each of the controllers 106a-106b could represent a computing device running a MICROSOFT WINDOWS operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any hardware, software, firmware, or combination thereof for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any hardware, software, firmware, or combination thereof for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any hardware, software, firmware, or combination thereof for controlling the overall operation of the system 100.

One or more operator stations 128 are coupled to the networks 124. The operator stations 128 represent computing or communication devices providing, for example, user access to the servers 114a-114b, 126. Each of the operator stations 128 includes any hardware, software, firmware, or combination thereof for supporting user access and control of the system 100. Each of the operator stations 128 could, for example, represent a computing device running a MICROSOFT WINDOWS operating system.

In particular embodiments, the various servers and operator stations may represent computing devices. For example, each of the servers 114a-114b, 126 could include one or more processors 130 and one or more memories 132 for storing instructions and data used, generated, or collected by the processor(s) 130. Each of the servers 114a-114b, 126 could also include at least one network interface 134, such as one or more Ethernet interfaces. Also, each of the operator stations 116, 128 could include one or more processors 136 and one or more memories 138 for storing instructions and data used, generated, or collected by the processor(s) 136. Each of the operator stations 116, 128 could also include at least one network interface 140, such as one or more Ethernet interfaces.

In one aspect of operation, at least one of the controllers 106a-106b represents a multivariable predictive control (MPC) controller or other type of controller that operates using a model 142. The model 142 generally represents at least part of an industrial process being controlled, such as by defining how the controller controls one or more of the actuators 102b based on input data from one or more of the sensors 102a. The identification of the model 142 (which involves a "system identification" defining how the process being controlled behaves) and the design of the controller 106a-106b (which involves selection of control parameters for the controllers) are often critical to the proper control of the process system.

In accordance with this disclosure, a tool 144 is provided in the system 100 at one or more locations. The tool 144 analyzes various data, such as historical data that was received from the sensors 102a and sent to the actuators 102b. The tool 144 also operates to perform system identification (for the model 142) and to perform controller design (for the controller 106a-106b). The system identification performed by the tool 144 could take into account the controller design, thereby enabling the tool 144 to more effectively perform both functions.

In some embodiments, a weighted normalized coprime factor can be minimized directly during this process. Also, a filter bank can be used to formulate an H infinity ($H_\infty$) optimization problem for data in the time domain, and an iterative approach can be used to identify model parameters with an acceptable maximum stability margin. These embodiments generally identify a lower-order model directly from test data by minimizing the normalized coprime factorization uncertainty of a weighted system (the minimum may or may not represent a global minimum). This technique could also be incorporated into a higher-order model reduction process, where a higher-order model is identified and then used to identify a lower-order model. The order reduction can involve robust control-oriented model reduction.

Either of these techniques can result in better results compared to other system identification and controller design techniques. For example, these techniques may result in better closed-loop control behavior. Also, these techniques could be performed in an on-line or off-line manner, meaning the techniques can be performed while a controller is operating (on-line) or not operating (off-line). The tool 144 includes any hardware, software, firmware, or combination thereof for performing system identification and controller design for a control system. The tool 144 could, for example, represent one or more computer programs executed by the processor(s) in the servers 114a-114b, 126 or the operator stations 116, 128.

Although FIG. 1 illustrates one example of a process control system 100, various changes may be made to FIG. 1. For example, a control system could include any number of sensors, actuators, controllers, servers, operator stations, networks, models, and tools. Also, the makeup and arrangement of the process control system 100 are for illustration only. Components could be added, omitted, combined, subdivided, or placed in any other suitable configuration according to particular needs. In addition, FIG. 1 illustrates one operational environment in which system identification and design can be used. This functionality could be used in any other suitable device or system.

Figure 2:
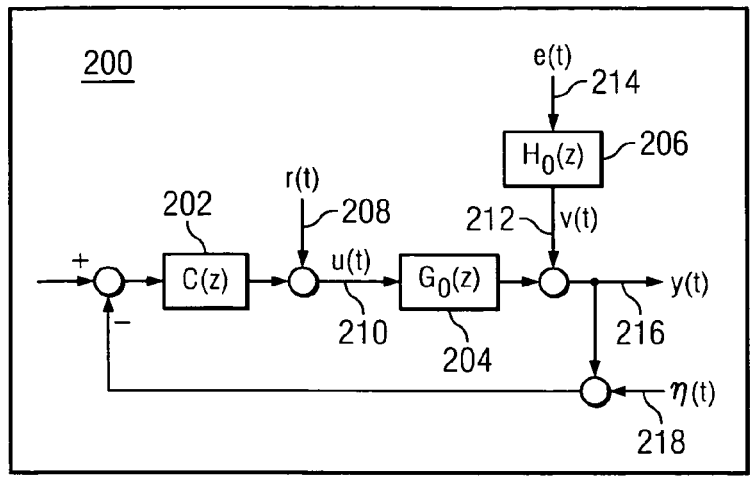
FIG. 2 illustrates an example representation of a process system to be controlled according to this disclosure.

FIG. 2 illustrates an example representation 200 of a process system to be controlled according to this disclosure. The process system representation 200 shown in FIG. 2 is for illustration only. Other process system representations could be used without departing from the scope of this disclosure. Also, for ease of explanation, the process system representation 200 is described as representing the process control system 100 of FIG. 1. The process system representation 200 could be associated with any other suitable system.

In FIG. 2, all inputs and outputs in the process system representation 200 are assumed to be multi-dimensional vectors. In this example, the logic implemented by a controller (such as controller 106a or 106b) is represented by a discrete controller representation 202. The controller representation 202 could, for example, represent a non-linear or time-invariant controller. The process being controlled by the controller is represented by a process model 204 (denoted $G_0(z)$). Noise is represented in the representation 200 by a discrete noise model 206 (denoted $H_0(z)$), which could be linear and time-invariant.

A dither signal 208 (denoted $r(t)$) can be superimposed on one or more outputs of the controller at time $t$. The resulting signal 210 (denoted $u(t)$) represents the input to the process. Unmeasurable disturbances 212 (denoted $v(t)$) are based on white noise disturbances 214 (denoted $e(t)$) provided to the discrete noise model 206. An output signal 216 (denoted $y(t)$) represents the output of the process being controlled. Sensor noise disturbances 218 (denoted $\eta(t)$) are combined with actual sensor measurements of the output signal 216. The sensor measurements (as affected by sensor noise disturbances 218) are fed back to the controller, such as by subtracting the sensor measurements from a desired setpoint.

Although FIG. 2 illustrates one example representation 200 of a process system, various changes could be made to FIG. 2. For example, a process system could be modeled in any other suitable manner.

FIGS. 3 through 13 illustrate a first example method for system identification and loop-shaping controller design according to this disclosure. This method could, for example, be performed by the tool 144 in the process control system of FIG. 1 (or by any other device or in any other system). The embodiment of the method shown in FIGS. 3 through 13 is for illustration only. Other embodiments could be used without departing from the scope of this disclosure.

The method shown in FIGS. 3 through 13 generally uses robust control theory to identify a nominal model and a model uncertainty associated with the model. This information is then used to perform robust controller design. Given any nominal model, a model uncertainty description can be found to explain the experimental data (such as prior data associated with the process system). In this method, system identification can be viewed as a problem requiring the identification of a nominal model and a model uncertainty description that is best for robust control. As a particular example, with loop-shaping as a primary controller design technique, the system identification can involve finding (or approximating) the nominal model that leads to the minimum normalized coprime uncertainty norm. As a result, the system identification is tightly integrated with loop-shaping optimal controller design.

Figure 3:
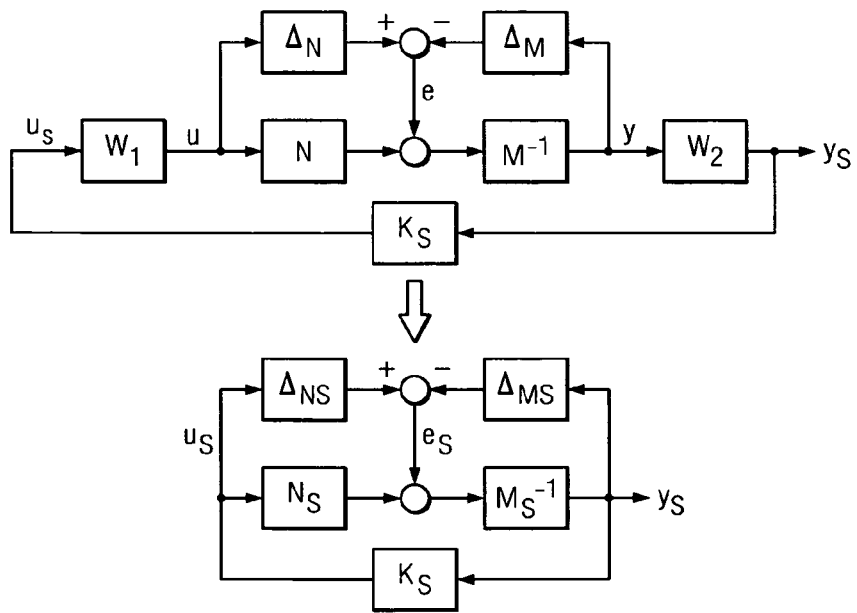
FIGS. 3 through 13 illustrate a first example method for system identification and loop-shaping controller design according to this disclosure.

With reference to FIG. 3, a coprime factor model uncertainty description is an efficient and convenient way of describing the model uncertainty for robust controller design. The left coprime uncertainty system $G_\Delta$ can have the following expression:

$$G_\Delta = (M + \Delta_M)^{-1}(N + \Delta_N) \quad (1)$$

where $G = M^{-1}N$ is the nominal model, $(N, M)$ is the left coprime factorization of model $G$, and $(\Delta_N, \Delta_M)$ are the two uncertainty terms. One approach to designing a robust controller for $G_\Delta$ is to design a controller $K$ for the nominal model $G$ with a stability margin requirement quantified by the small gain theorem. In other words, the controller $K$ stabilizes the uncertainty system $G_\Delta$, provided that the controller $K$ stabilizes the nominal system $G$ and provided that the following is true:

$$\left\| \begin{bmatrix} K(I-GK)^{-1}M^{-1} \\ (I-GK)^{-1}M^{-1} \end{bmatrix} \right\|_\infty \cdot \|[\Delta_N \ \Delta_M]\|_\infty \le 1. \quad (2)$$

Normalized coprime factorization (NCF) can be useful in controller design. Assuming $(N, M)$ is an NCF pair of the nominal system $G$ and $(\Delta_N, \Delta_M)$ is the corresponding uncertainty pair, an optimal controller $K$ for the nominal system $G$ can be calculated directly to maximize the stability margin as follows:

$$\varepsilon_{max} = \left( \inf_K \left\| \begin{bmatrix} K(I-GK)^{-1}M^{-1} \\ (I-GK)^{-1}M^{-1} \end{bmatrix} \right\|_\infty \right)^{-1}. \quad (3)$$

The optimal stability margin can be given in terms of the Hankel norm of the normalized coprime factors as follows:

$$\Delta_{max} = \sqrt{1 - \|[N M]\|_H^2}. \quad (4)$$

The optimal controller designed for the nominal model $G$ may not, however, be practically useful unless controller performance requirements are incorporated into the design. A loop-shaping robust controller design technique can be used, where a pre-weighting $W_1$ and/or a post-weighting $W_2$ are used to augment the nominal model $G$. Here, the weightings $W_1$ and $W_2$ are used to incorporate controller performance requirements into the system identification process. The controller performance requirements can be specified using $W_1$ and $W_2$ so that a weighted system $G_S = W_2 G W_1$ has a desired loop shape. An optimal controller $K_S$ can then be designed for the weighted system $G_S$. The final controller $K$ for the original model $G$ can be constructed as $W_1 K_S W_2$. Here, $(N_S, M_S)$ denotes the normalized coprime factorization of $G_S$, $(\Delta_{N_S}, \Delta_{M_S})$ denotes the normalized coprime factor uncertainty of $G_S$, and $\|[\Delta_{N_S} \ \Delta_{M_S}]\|_\infty$ represents the weighted system uncertainty.

The robust stability condition of the weighted system could be expressed as:

$$(1 - \|N_S M_S\|_H^2)^{-1/2} \cdot \|\Delta_{N_S} \Delta_{M_S}\|_\infty < 1. \quad (5)$$

The system identification objective can be cast as the following minimization:

$$\min_{N,M} \|[\Delta_{N_S} \ \Delta_{M_S}]\|_\infty. \quad (6)$$

The first term of the stability condition in Equation (2), or its weighted versions, can be made all-pass by the optimal controller $K$ or $K_S$. It is then up to the system identification process to minimize the uncertainty as uniformly as possible in the frequency domain, as well as to make its spectrum "flat" by proper selection of any adjustable parameters. Then, if the product in Equation (5) is smaller than unity, the controller provides robust stability. If not, the control objective implied by the weighting functions may not be feasible, and adjustments to the system identification can occur (such as by selecting different weighting functions).

In light of the representations shown in FIG. 3, the following can be obtained:

$$M \cdot y = N \cdot u + \Delta_N \cdot u - \Delta_M \cdot y \quad (7)$$

$$M \cdot W_2^{-1} \cdot y_S = N \cdot W_1 \cdot u_S + \Delta_N \cdot W_1 \cdot u_S - \Delta_M \cdot W_2^{-1} \cdot y_S \quad (8)$$

Multiplying both sides of Equation (8) by $M_S \cdot W_2 \cdot M^{-1}$ yields the following:

$$(M_S + M_S \cdot W_2 \cdot M^{-1} \cdot \Delta_M \cdot W_2^{-1}) y_S = (N_S + M_S \cdot W_2 \cdot M^{-1} \cdot \Delta_N \cdot W_1) u_S \quad (9)$$

As a result, the following relationships exist between the uncertainty in the original system and the uncertainty in the weighted system:

$$\Delta_{N_S} = M_S \cdot W_2 \cdot M^{-1} \cdot \Delta_N \cdot W_1 \quad (10)$$

$$\Delta_{M_S} = M_S \cdot W_2 \cdot M^{-1} \cdot \Delta_M \cdot W_2^{-1} \quad (11)$$

The derivation of Equations (7) through (11) may be based on the illustrations shown in FIG. 3. Here, $\Delta_{N_S}$ and $\Delta_{M_S}$ may be guaranteed to be stable, and the right half plane (RHP) zeros of M may appear as RHP zeros in $M_S$. The tool 144 may generally operate to find a nominal model and its corresponding model uncertainty bounds to explain the data such that the weighted uncertainty has the smallest norm with the prescribed controller performance requirement. This can be expressed as the following identification objective:

$$\min_{\theta} \| [ \Delta_{N_S} \; \Delta_{M_S} ] \|_\infty \quad (12)$$

$$\text{s.t.:} \begin{cases} M(\theta) \cdot y - N(\theta) \cdot u = e \\ \Delta_N \cdot u - \Delta_M \cdot y = e \\ \Delta_{N_S} = M_S \cdot W_2 \cdot M^{-1} \cdot \Delta_N \cdot W_1 \\ \Delta_{M_S} = M_S \cdot W_2 \cdot M^{-1} \cdot \Delta_M \cdot W_2^{-1} \end{cases}$$

where $\theta$ represents the vector of unknown model parameters to be identified. In particular embodiments, Equation (12) could have an associated constraint used to ensure robust stability control. This constraint could be expressed as:

$$\| \Delta_{N_S} \Delta_{M_S} \|_\infty \leq \sqrt{1 - \| N_S M_S \|_H^2}. \quad (12.1)$$

Figure 4:
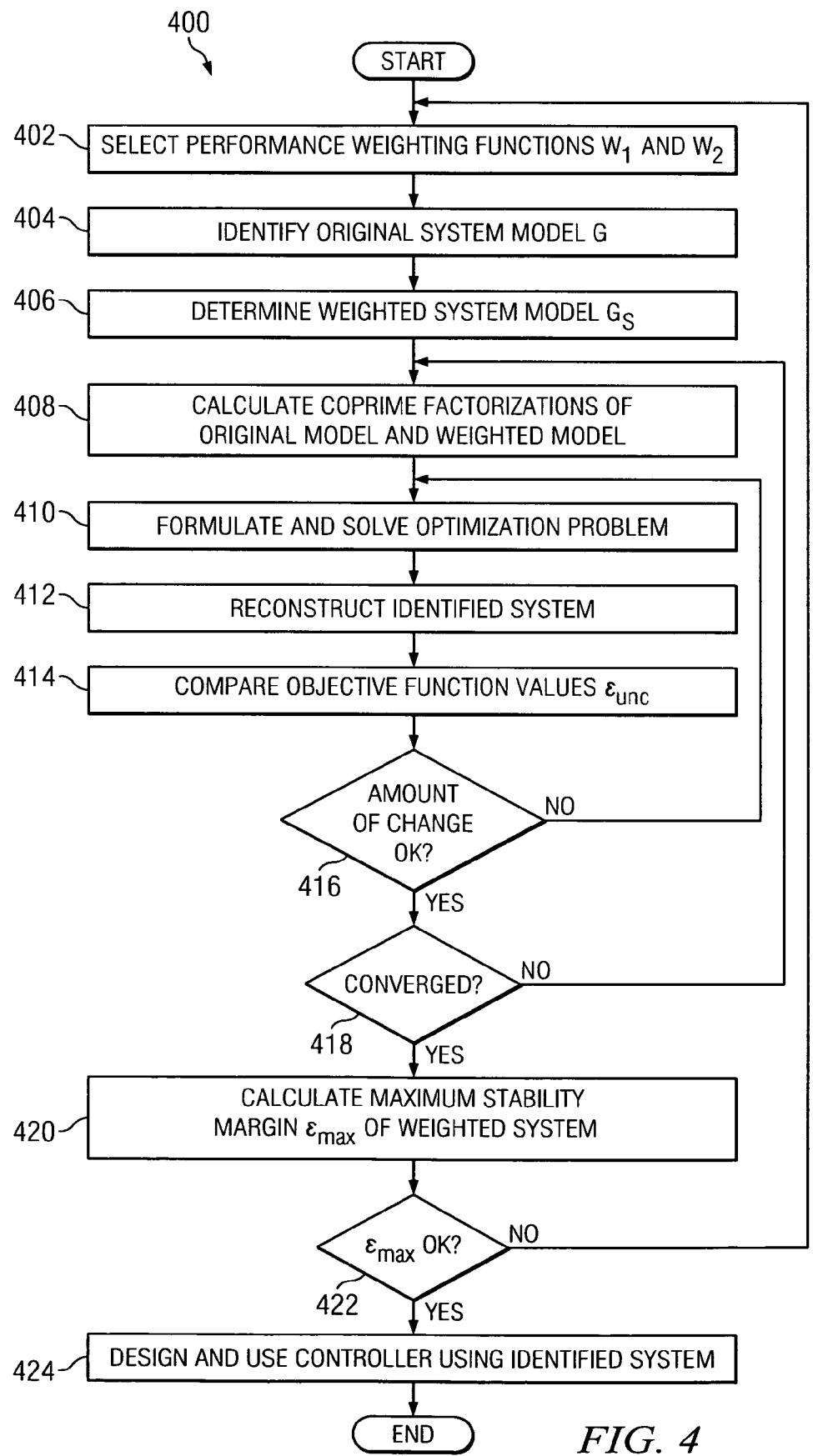

With this in mind, FIG. 4 illustrates an example method 400 for system identification and loop-shaping controller design. In this example embodiment, the method 400 includes selecting the performance weighting functions $W_1$ and $W_2$ used to create a weighted system at step 402. Any suitable weighting functions could be used, such as weighting functions based on the controller performance requirements or based on any preliminary or other knowledge about the system to be controlled.

An original model of the system to be controlled is identified at step 404. The original model could be identified by the tool 144 in any suitable manner, such as when the tool 144 generates the model or receives the model from an external source. For example, the tool 144 or external source could generate the system model based on preliminary or other knowledge about the system to be controlled. The model could also be generated by the tool 144 or external source using any traditional system identification technique(s), such as the prediction error method (PEM).

A weighted model of the system to be controlled is generated at step 406. This could include, for example, using the original system model and the performance weighting functions $W_1$ and $W_2$ to identify the weighted system model. As a particular example, the weighted system model $G_S$ could equal $W_2 G W_1$.

Coprime factorizations of the original and weighted system models are determined at step 408. Any suitable coprime factorization could be used for the original system model, including a normalized coprime factorization. Also, a normalized coprime factorization could be used for the weighted system model. For a single input, single output (SISO) system, the coprime factorization (N,M) of a system with a state-space representation (A,B,C,D) can be expressed as:

$$N = \begin{bmatrix} F & \theta_1 \\ q & \theta_3 \end{bmatrix} \quad M = \begin{bmatrix} F & \theta_2 \\ q & 1 \end{bmatrix}. \quad (13)$$

The values (F,q) can be selected beforehand to be a stable, completely observable pair. The system defined by Equation (13) may be equivalent to the standard (A,B,C,D) representation after a similarity transformation of the following relations (provided that the choice of F and q is such that the two systems have the same observability indices):

$$\begin{array}{ll} A \sim F - \theta_2 q; & B \sim \theta_1 - \theta_2 \theta_3 \\ C \sim q; & D \sim \theta_3 \end{array} \quad (14)$$

For multiple input, single output (MISO) identification, the orders of the various subsystems can be appropriately selected.

A linear matrix inequality (LMI) problem is formulated and solved at step 410. This could involve the following operations. Based on Equations (13) and (14), given the pair (F,q), the following may completely specify the system to be controlled:

$$\theta = (\theta_1, \theta_2, \theta_3)'. \quad (15)$$

The system identification problem can then be formulated as the problem of finding $\theta$ that results in the smallest weighted coprime uncertainty. Using Equations (10) and (11), the following can be obtained:

$$e = \Delta_N \cdot u - \Delta_M \cdot y \quad (16)$$

$$= (M_S \cdot W_2 \cdot M^{-1})^{-1} (\Delta_{N_S} \cdot W_1^{-1} \cdot u - \Delta_{M_S} \cdot W_2 \cdot y).$$

The weighted normalized coprime uncertainty can therefore be estimated as follows:

$$\| [ \Delta_{N_S} \; \Delta_{M_S} ] \|_\infty = \max_w \frac{\| M_S \cdot W_2 \cdot M^{-1} \cdot e(w) \|_2}{\left\| \begin{bmatrix} W_1^{-1} \cdot u(w) \\ W_2 \cdot y(w) \end{bmatrix} \right\|_2}. \quad (17)$$

Since there is typically limited time-domain input data u(t) and output data y(t), an error e(t) is present and can be constructed from the data u(t) and y(t) and the unknown parameters $\theta$ in a linear model as follows:

$$e = M \cdot y - N \cdot u \quad (18)$$

$$= (1 + q(sI - F)^{-1} \theta_2) y - (\theta_3 + q(sI - F)^{-1} \theta_1) u$$

$$e(t) = y(t) - \Phi(t) \theta \quad (19)$$

$$\Phi(t) = [I(sI - F')^{-1} q' u(t) - I(sI - F')^{-1} q' y(t) u(t)]. \quad (20)$$

For SISO systems, the system identification problem of Equation (12) then becomes:

$$\min_{\theta}\max_{w} \frac{|M_S(\theta)\cdot W_2\cdot M(\theta)^{-1}\cdot e(w)|}{\sqrt{|W_1^{-1}\cdot u(w)|^2 + |W_2\cdot y(w)|^2}}. \quad (21)$$

s.t. (19)

Equation (21) could have an associated robust stability constraint, such as one expressed as:

$$\varepsilon_{unc} \leq \sqrt{1 - \|N_S M_S\|_H^2} \quad (21.1)$$

where $\varepsilon_{unc}$ represents the objective function value. The solution to Equation (21) may use the frequency content of $e(w)$, $u(w)$, and $y(w)$. One technique for obtaining this frequency content is through the use of a discrete-time Fourier transform.

Figure 5:
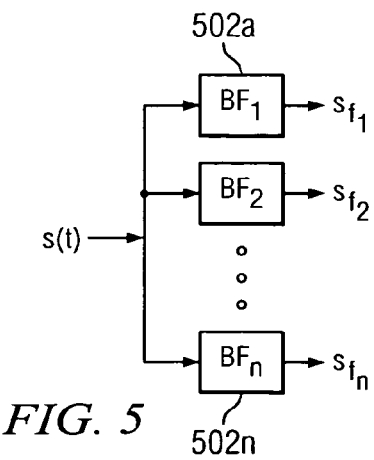

Another technique for obtaining this frequency content involves the use of filter banks to estimate the power spectrum of the time-domain signal. An example of this is shown in FIG. 5, where a bank of bandpass filters 502a-502n is used to decompose a signal $s(t)$. In this example, $BF_i$ denotes the bandpass filter i, which has ideal cutoff frequencies at $\omega_{il}$ and $\omega_{ih}$:

$$BF_i(\omega) = \begin{cases} 1, \omega \in (\omega_{il}, \omega_{ih}) \\ 0, \text{else} \end{cases}. \quad (22)$$

Also, $s(t)$ denotes any time-domain signal, and $s_{fi}=BF_i(s)$ denotes the signal $s(t)$ filtered by $BF_i$. Ideally, $s_{fi}(\omega) \approx 0$ for $\omega < \omega_{il}$ and $\omega > \omega_{ih}$. It then follows that:

$$|s_{fi}(\omega_i)| \approx cf_i \|s_{fi}(t)\|_2 \quad (23)$$

where $cf_i$ is a constant value for each filter $BF_i$. Using Equation (23), with a bank of filters 502a-502n covering the frequency range of interest, the system identification problem in Equation (21) can be approximated as:

$$\min_{\theta}\max_{i} \frac{\|M_S(\theta)\cdot W_2\cdot M(\theta)^{-1}\cdot (y_{fi}(t) - \phi_{fi}(t)\cdot \theta)\|_2}{\sqrt{\|W_1^{-1}\cdot u_{fi}(t)\|_2^2 + \|W_2\cdot y_{fi}(t)\|_2^2}}. \quad (24)$$

This can be further formulated as:

$$\min_{\theta,\varepsilon_{unc}} \varepsilon_{unc}. \quad (25)$$

s.t. (24)

Equation (25) could have the same robust stability constraint as shown in Equation (21.1).

An iterative approach can be used to solve Equation (25). For example, at the $(k+1)^{th}$ iteration, the identification result $\theta_k$ from the $k^{th}$ step is known, and $M_S(\theta_k)W_2M(\theta_k)^{-1}$ can be calculated. Also, the following value may represent a constant $c_i$ at each frequency $\omega_i$:

$$c_i = \sqrt{\|W_1^{-1}\cdot u_{fi}(t)\|_2^2 + \|W_2\cdot y_{fi}(t)\|_2^2}. \quad (26)$$

The following can then be defined:

$$Y_{fi}(t) = M_S(\theta_k)\cdot W_2\cdot M(\theta_k)^{-1}\cdot y_{fi}(t)/c_i \quad (27)$$

$$\Psi_{fi}(t) = M_S(\theta_k)\cdot W_2\cdot M(\theta_k)^{-1}\cdot \Phi_{fi}(t)/c_i \quad (28)$$

Constraints can then be expressed as:

$$(Y_{fi}(t)-\Psi_{fi}(t)\cdot\theta)'(Y_{fi}(t)-\Psi_{fi}(t)\cdot\theta) \leq \varepsilon_{unc}^2 \quad (29)$$

The system identification problem can therefore be formulated as the following optimization problem with LMI constraints at each step of the iteration:

$$\min_{\theta,\varepsilon_{unc}} \varepsilon_{unc}. \quad (30)$$

s.t. (29)

Equation (30) could have the same robust stability constraint as shown in Equation (21.1). The LMI constraint can generally be expressed in the following form:

$$F(x) = F_0 + \sum_{i=1}^{m} x_i F_i < 0 \quad (31)$$

where $F_i$ is symmetric. The LMI is therefore a convex constraint set on x, and the following two LMI constraints are equivalent:

$$R(x) < 0, Q(x) - S(x)R(x)^{-1}S(x)^T < 0 \quad (32)$$

$$\begin{bmatrix} Q(x) & S(x) \\ S(x)^T & R(x) \end{bmatrix} < 0. \quad (33)$$

The constraints in Equation (29) can then be expressed as:

$$Y_{fi}'Y_{fi} - Y_{fi}'\Psi_{fi}\theta - \theta'\Psi_{fi}'Y_{fi} - \varepsilon_{unc}^2 + \theta'\Psi_{fi}'\Psi_{fi}\theta \leq 0. \quad (34)$$

Using QR decomposition, the following can be obtained:

$$\Psi_{fi}'\Psi_{fi} = (QR)'(QR) = R'R, \quad (35)$$

or $$\begin{bmatrix} Y_{fi}'Y_{fi} - Y_{fi}'\Psi_{fi}\theta - \theta'\Psi_{fi}'Y_{fi} - \varepsilon_{unc}^2 & (R\theta)' \\ R\theta & -1 \end{bmatrix} \leq 0. \quad (36)$$

Based on these LMI constraints, the optimization problem can be solved to perform system identification.

In this embodiment, the value of $M_S(\theta_k)W_2M(\theta_k)^{-1}$ is fixed when calculating $\theta_{k+1}$, which allows Equation (30) to be formulated from Equation (25). An iterative approach to solving Equation (25) can be used since $\theta_{k+1}$ leads to a different $M_S(\theta_{k+1})W_2M(\theta_{k+1})^{-1}$. To support this iteration, the system is reconstructed at step 412, such as by using the current (F,q) pair and the values of θ identified when solving Equation (30). The objective function value $\varepsilon_{unc}$ for the current iteration step is compared to the objective function value for the preceding iteration step at step 414. Here, the value of $\varepsilon_{unc}$ can be reevaluated with the updated value $M_S(\theta_{k+1})W_2M(\theta_{k+1})^{-1}$. Also, the updated value of $\varepsilon_{unc}$ (for $\theta_{k+1}$) is compared to the prior value of $\varepsilon_{unc}$ (for with $\theta_k$). In some embodiments, a determination is made as to whether the amount of change between the $\varepsilon_{unc}$ values is acceptable at step 416. In these embodiments, because the term $M_S(\theta_k)W_2M(\theta_k)^{-1}$ is fixed in solving $\theta_{k+1}$ it can be implicitly assumed that $M_S(\theta_k)W_2M(\theta_k)^{-1}$ has a similar behavior as $M_S(\theta_{k+1})W_2M(\theta_{k+1})^{-1}$. For this reason, a constraint can be placed on the change of θ when solving Equation (30). This constraint could have the format $\|\theta_{k+1}-\theta_k\|_2 \le \alpha$, where the value of $\alpha$ ideally decreases during each iteration. If the value of $\epsilon_{unc}$ increases between iterations or does not decrease, the value of $\alpha$ in $\|\theta_{k+1}-\theta_k\|_2 \le \alpha$ is reduced, and the process returns to step 410 to resolve the optimization problem using the smaller $\alpha$ value to re-identify a new $\theta_{k+1}$. In particular embodiments, the initial value of $\alpha$ can be a function of the norm of the current $\theta_k$. If the value of $\epsilon_{unc}$ decreases, a determination is also made as to whether the values have converged at step 418. This could include, for example, determining if a difference between the objective function values is less than a specified threshold. If not, the process returns to step 408.

Otherwise, the maximum achievable stability margin $\epsilon_{max}$ for the weighted system is determined at step 420. The maximum achievable stability margin $\epsilon_{max}$ could be determined as follows:

$$\epsilon_{max} = \sqrt{1 - \|N_S M_S\|_H^2}. \tag{37}$$

A determination is made as to whether the maximum achievable stability margin $\epsilon_{max}$ is greater than the objective function value $\epsilon_{unc}$ for the current iteration by a desired amount at step 422. In some embodiments, this operation could be expressed as determining whether $\epsilon_{max} - \epsilon_{unc} > 0$. In other embodiments, this operation could be expressed as determining whether $\epsilon_{max} - \epsilon_{unc} >$ Threshold (where Threshold represents a positive non-zero value), meaning the maximum achievable stability margin $\epsilon_{max}$ needs to exceed the objective function value $\epsilon_{unc}$ for the current iteration by some non-zero amount.

If this condition is not met, system re-identification is performed by returning to step 402 to repeat the process. The system re-identification could involve changing the performance objective, such as by altering the values of $W_1$ and $W_2$. It could also involve se-testing the system to obtain better data about the system. It could further involve identifying an initial model with a larger $\epsilon_{max}$ value. Otherwise, if this condition is met, the system has been properly identified while taking into account the design of the controller that will be used to control the system. At that point, the controller can be designed at step 424, such as by selecting proper parameters for the controller using the identified system.

The following provides a brief analysis of one specific implementation of this identification technique. Assume here that $W_1 = W_2 = 1$ and that u and y are generated by an unknown linear system $G_0$ with NCF $(N_0, M_0)$ so that $y = G_0 u = M_0^{-1} N_0 u$. The identified model for the system can be denoted $G_{id}$ with NCF $(N_{id}, M_{id})$. The NCF prediction error for $(N_{id}, M_{id})$ can be expressed as:

$$e = M_{id} y - N_{id} u = M_{id}(G_0 - G_{id})u. \tag{38}$$

Let $\Phi_{ef}(W)$, $\Phi_{uf}(W)$, and $\Phi_{yf}(W)$ denote the spectrum of the signals $e_f$, $u_f$, and $y_f$, respectively. The following can then be obtained:

$$\Phi_{ef}(w) = |M_{id}(jw)|^2 |G_0(jw) - G_{id}(jw)|^2 \Phi_{uf}(w) \tag{39}$$

$$\Phi_{uf}(w) + \Phi_{yf}(w) = \frac{1}{|M_0(jw)|^2} \Phi_{uf}(w). \tag{40}$$

With the assumption that $W_1 = W_2 = 1$, the $i^{th}$ constraint of the optimization problem in Equation (30) is equivalent to:

$$\frac{\|e_{fi}(t)\|_2^2}{\left\| \begin{bmatrix} \|u_{fi}(t)\|_2 \\ \|y_{fi}(t)\|_2 \end{bmatrix} \right\|_2^2} = \frac{\int_{-\pi}^{\pi} \Phi_{efi}(w) dw}{\int_{-\pi}^{\pi} (\Phi_{ufi}(w) + \Phi_{yfi}(w)) dw} \le \varepsilon_{unc}^2. \tag{41}$$

Using Equations (39) and (40), with each bandpass filter $BF_i$ the following can be obtained:

$$\frac{\int_{\omega_{il}}^{\omega_{ih}} |M_{id}(jw)|^2 |G_0(jw) - G_{id}(jw)|^2 \Phi_{ufi}(w) dw}{\int_{\omega_{il}}^{\omega_{ih}} \frac{1}{|M_0(jw)|^2} \Phi_{ufi}(w) dw} \le \varepsilon_{unc}^2. \tag{42}$$

Assume $\omega_{ci}$ represents the center frequency of $[\omega_{il}, \omega_{ih}]$. If $\omega_{il}$ and $\omega_{ih}$ are very close and $BF_i$ is a narrow bandpass filter, the terms in Equation (42) can be treated as piece-wise constants, which then provides the following result:

$$(|M_{id}(jw_{ci})||G_0(jw_{ci}) - G_{id}(jw_{ci})||M_0(jw_{ci})|)^2 \le \epsilon_{unc}^2 \tag{43}$$

The $L_2$-gap of two systems $G_1$ and $G_2$ can be defined as:

$$\delta_{L_2}(G_1, G_2) = \|M_1(G_1 - G_2)M_2\|_\infty \tag{44}$$

The v-gap of two systems $G_1$ and $G_2$ can be defined as:

$$\delta_v(G_1, G_2) = \begin{cases} \delta_{L_2}(G_1, G_2), & W(G_1, G_2) = 0 \\ 1, & \text{otherwise} \end{cases} \tag{45}$$

$$W(G_1, G_2) = wno \det(I + G_2^* G_1) + \eta(G_1) - \eta(G_2) \tag{46}$$

where wno refers to winding number and $\eta(G_x)$ represents the number of unstable poles in the system $G_x$. Using the technique shown in FIG. 4, the $L_2$-gap metric $\delta_{L_2}(G_{id}, G_0)$ can be minimized, and the v-gap metric $\delta_v(G_{id}, G_0)$ can be minimized when the winding number condition is satisfied. This means that the identification problem can be expressed as:

$$\min_{G \in s} \delta_{L2}(W_2 G_{id} W_1, W_2 G_0 W_1) \tag{47}$$

The right-hand side in Equation (44) is the maximum chordal distance between $G_1(jw)$ and $G_2(jw)$, and the chordal distances between the weighted identified model and the weighted true model are estimated at different frequency points using the bandpass filters 502a-502n (so that the peak of the distances is minimized). The winding number condition above can be enforced in any suitable manner, such as by using known techniques or by using Hankel optimization of the system as an indirect, post-identification way to satisfy the winding number condition. With the weighting factors $W_1$ and $W_2$, it is also possible to show that $\delta_{L_2}(W_2 G_{id} W_1, W_2 G_0 W_1)$ is minimized with the technique shown in FIG. 4.

When the data is corrupted by an additive disturbance d(t), the system identification problem can become more complicated. The output data y(t) can now be expressed as:

$$y(t) = G_0 \cdot u(t) + d(t). \tag{48}$$

Assuming that d(t) is independent of u(t) and y(t), the constraint of the optimization problem in Equation (30) can be reduced to:

$$|M_{id}(jw)|^2 \left( |G_0(jw) - G_{id}(jw)|^2 + \frac{\Phi_d(w)}{\Phi_u(w)} |M_0|^2 \right) \over 1 + |M_0|^2 \frac{\Phi_d(w)}{\Phi_u(w)}. \quad (49)$$

Here, $\Phi_d$ and $\Phi_u$ represent the power spectrum of the disturbance d and the input signal u, respectively. From this, the following can be observed. If the additive disturbance d is small compared to the input u, $$\frac{\Phi_d}{\Phi_u}$$

may be small, and the identified system can at least approximately minimize the $L_2$-gap. Also, if $$\frac{\Phi_d}{\Phi_u}$$

is large at certain frequencies, there can be different trade-offs depending on the magnitude of $|M_0(jw)|$ at those frequencies and the original system $G_0(jw)$.

As a particular example of the use of the method 400, assume a "true" or actual process to be identified has the following form:

$$G_0(s) = \frac{300s^2 + 40s + 1}{30000s^4 + 2500s^3 + 450s^2 + 15s + 1}. \quad (50)$$

Figure 6A:
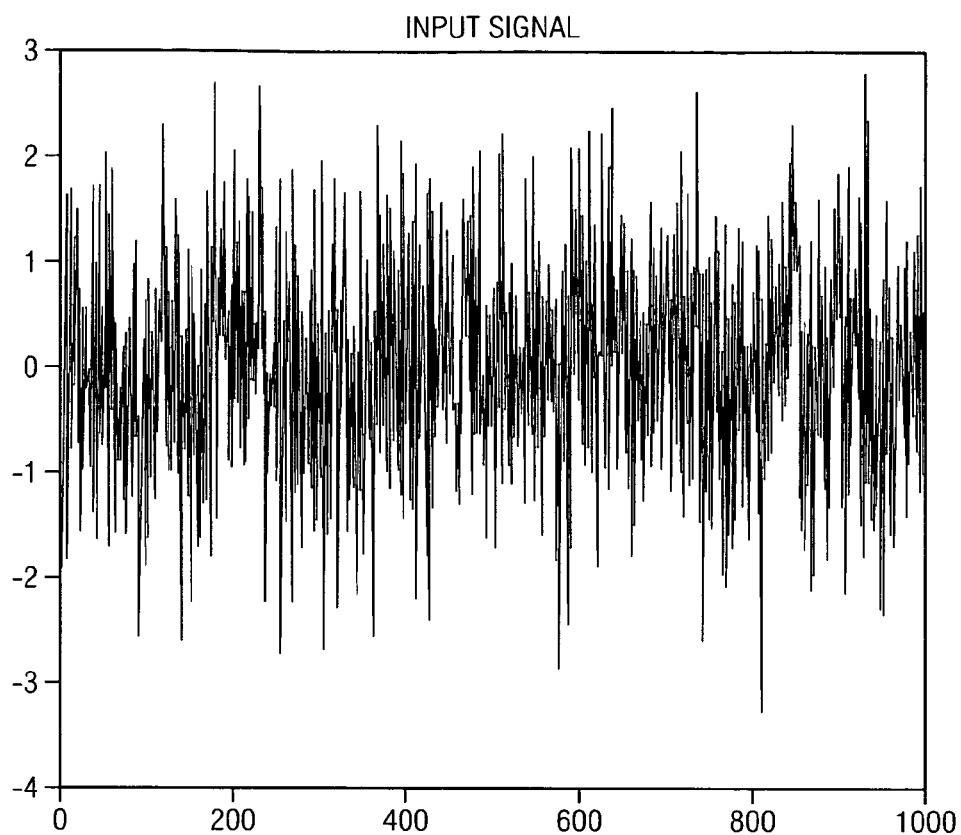
Figure 6B:
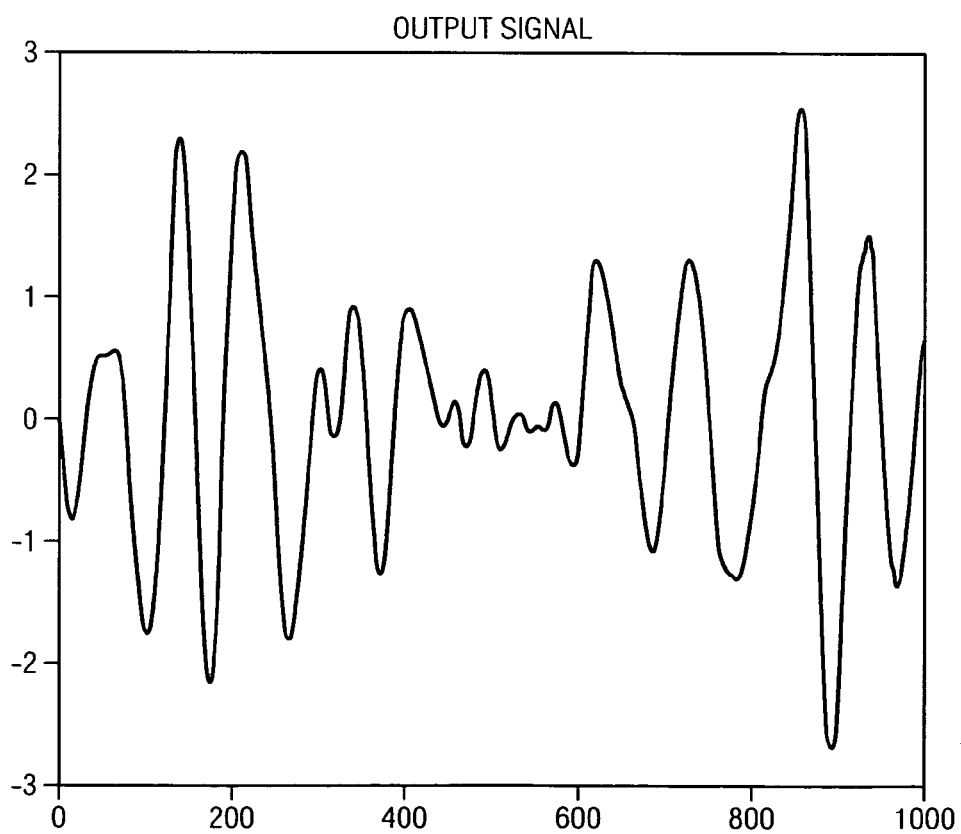

White noise having a zero mean and a variance of one is used as the excitation input signal (u), and one thousand data points (y) are collected at a sampling rate of one sample per second. These signals are shown in FIGS. 6A and 6B, which vertically plot the values of the input and output signals and horizontally plot the sample number (over time). The goal in this example is to (i) identify a second-order model from this test data and (ii) apply a loop-shaping optimal controller design technique to obtain a controller from the identified model and a preselected weighting. The designed controllers are not further described since they can be easily calculated using known techniques.

Figure 7:
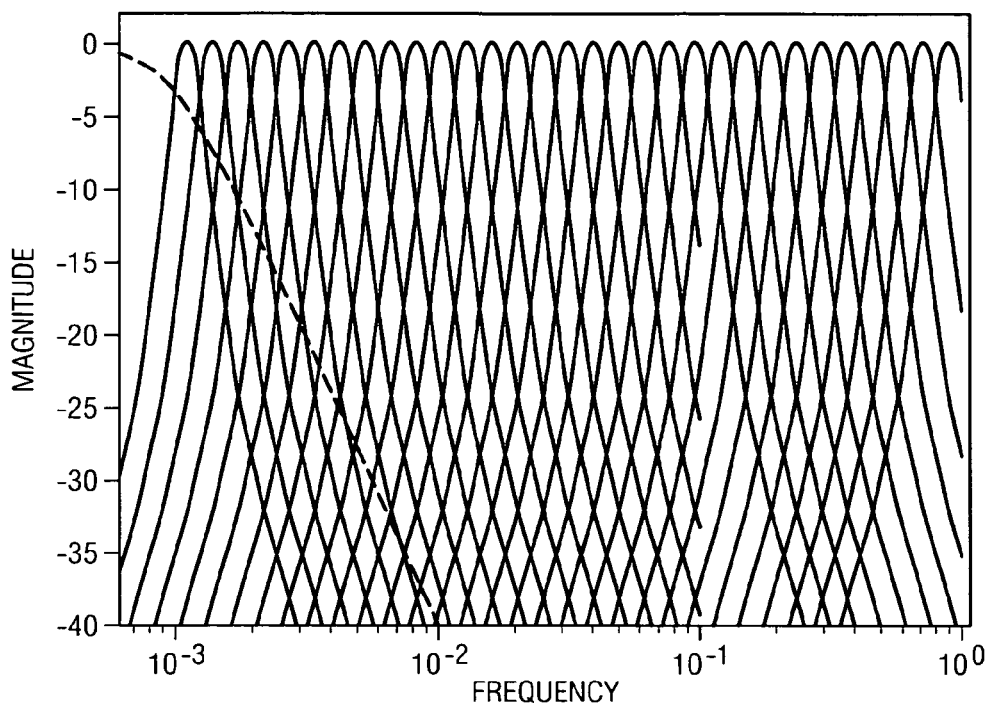

A set of thirty-two bandpass filters 502a-502n can be used to cover the frequency range $\Omega \epsilon(0,1)$. The filters can be designed as second-order Butterworth filters having Bode plots as shown in FIG. 7. To start the iterative identification process, an output error (OE) technique can be used to identify a second-order model $G_{oe}$. The NCF (N,M) of $G_{oe}$ can be calculated, and the pair (F,q) can be set as the (A,C) term of (N,M). A model $G_{id1}$ can be obtained using the weighting function W=0.1/s and clean simulation data, which can result in the following model:

$$G_{id1}(s) = \frac{-0.0083s + 0.0140}{s^2 + 0.0186s + 0.0072}. \quad (51)$$

If a faster controller response is desired, a new weighting function can be used. With W=1/s and using the same identification procedure, a new model $G_{id2}$ can be identified:

$$G_{id2}(s) = \frac{-0.01s + 0.0112}{s^2 - 0.0023s + 0.0092}. \quad (52)$$

Figure 8:
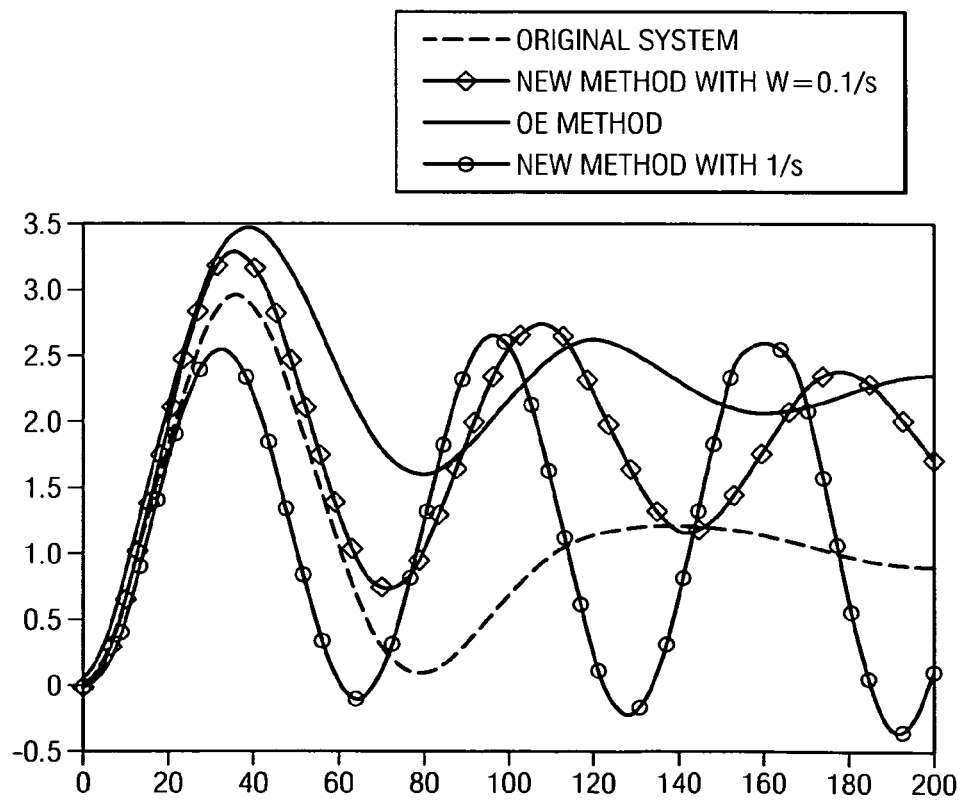
Figure 9:
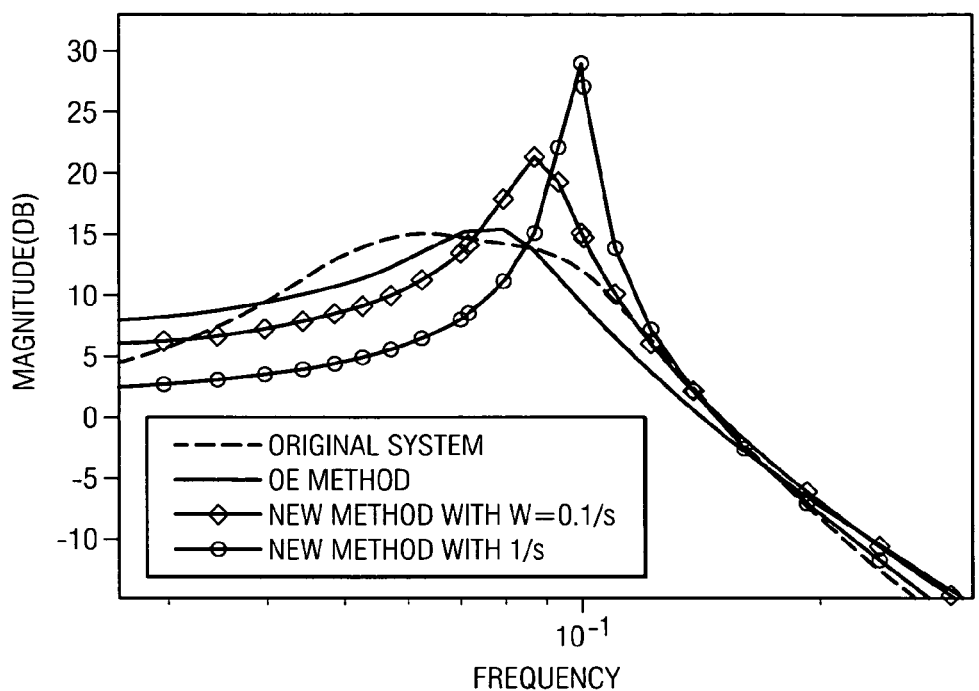
Figure 10:
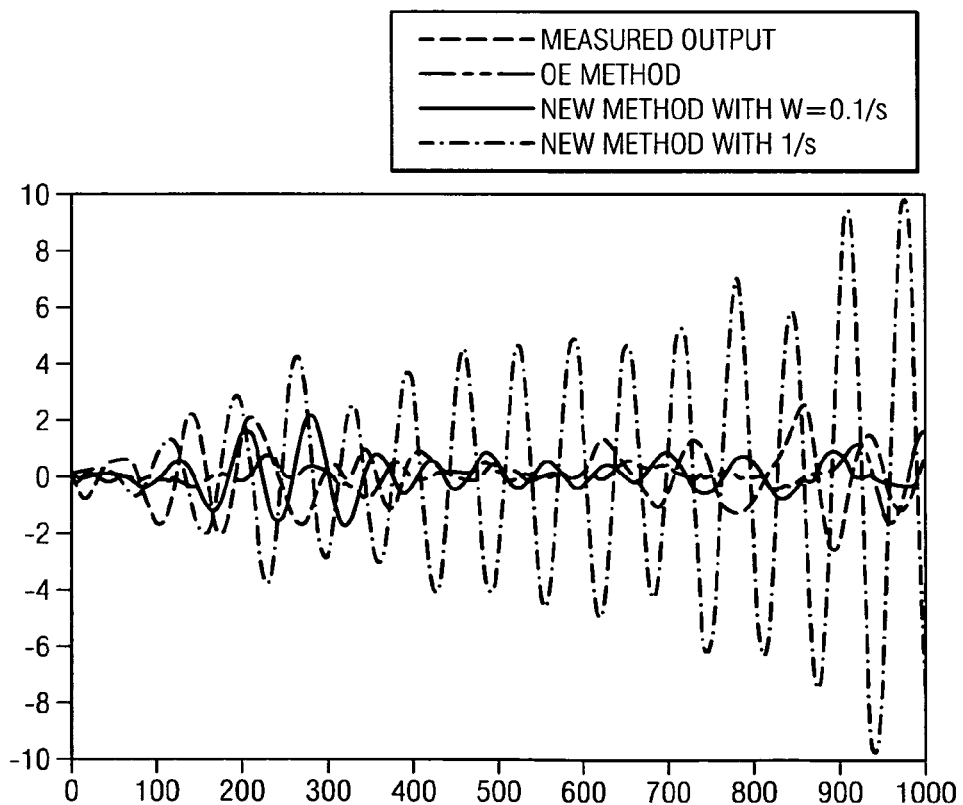
Figure 11:
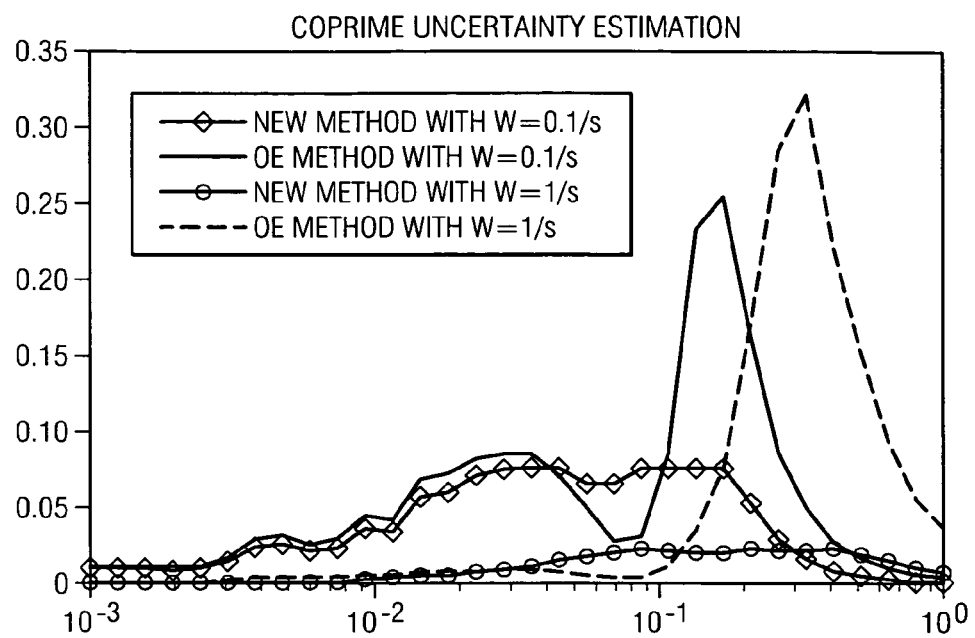
Figure 12:
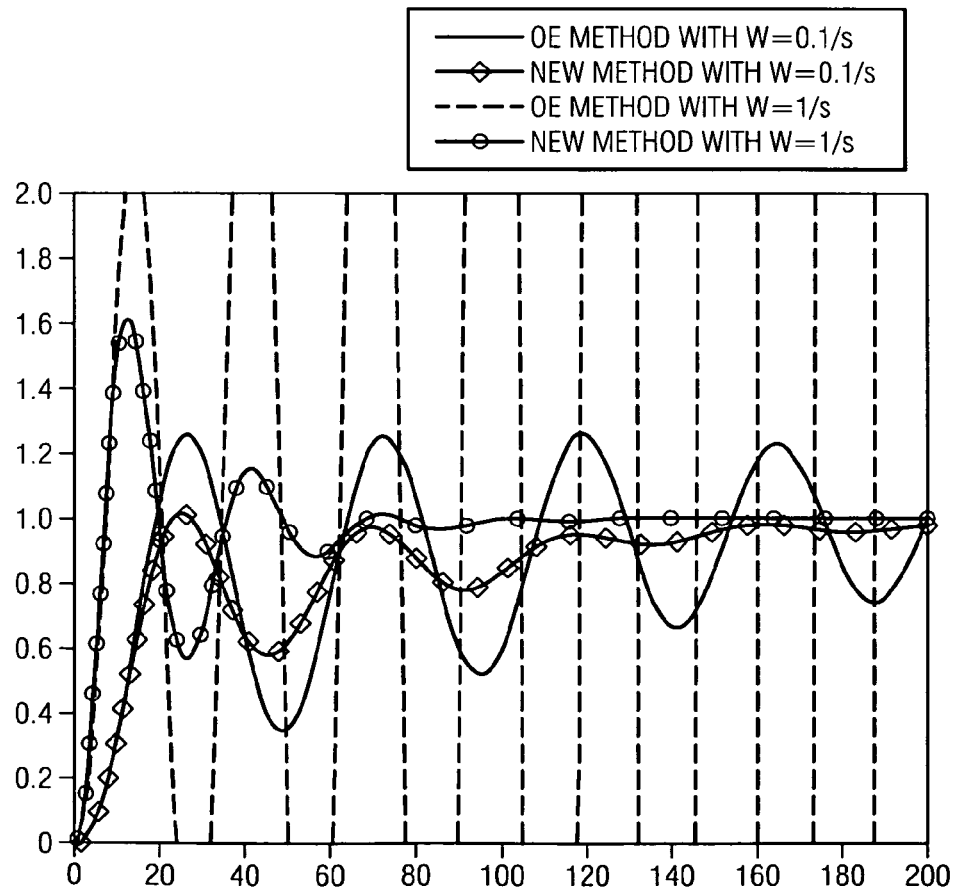

Both models $G_{id1}$ and $G_{id2}$ can be compared to the original model $G_{oe}$. The step responses of the models are shown in FIG. 8, and the Bode plots of the models are shown in FIG. 9. Also, the output prediction errors of the models are shown in FIG. 10, and the estimated NCF uncertainties of the weighted systems at each frequency point are shown in FIG. 11. In FIG. 11, the NCF uncertainties of the weighted OE model are reconstructed from the model and the data. The closed-loop step responses of the controllers designed from these different models are shown in FIG. 12.

As can be seen in FIG. 10, the OE model gives the smallest output prediction error norm, which is the identification objective of the OE technique. However, the OE model yields a bigger NCF uncertainty for the weighted system. While the identified model $G_{id2}$ is an unstable model and has the biggest prediction error norm, it also has the smallest NCF uncertainty for the weighted system and the best control performance. This illustrates that minimizing the prediction error may not satisfy the robust control needs. Also, as can be seen in FIG. 11, the method 400 has a "flatter" uncertainty distribution, meaning it can become more uniform as the number of adjustable parameters (i.e. the model order) increases. Further, as can be seen in FIG. 12, the controller designed from the original model $G_{oe}$ with a weighting W=1/s is unstable.

Among other things, one advantage of the method 400 is that it can provide an indication whether the identified model and the resulting optimal loop-shaping controller can be used with confidence. The controller design is truly integrated into the system identification, and an optimal controller can be directly calculated at the end of identification. In particular, the controller stability margin is compared to the coprime uncertainty to decide if re-identification or re-testing is needed. For both weighting functions used in this example (0.1/s and 1/s), the method 400 yields models with $\epsilon_{max} > \epsilon_{unc}$. This indicates that the corresponding optimal controllers can handle the uncertainty system with a good stability margin. If a faster controller is desired, new weighting functions can be designed, and the bandwidth of the controller can be pushed. By comparing $\epsilon_{max}$ and $\epsilon_{unc}$, it is possible to determine how much the controller can be pushed at the identification stage. In addition, the estimated values of $\epsilon_{unc} = \|[\Delta_{N_S} \Delta_{M_S}]\|_\infty$, $\epsilon_{max}$ as well as values of $\delta_\nu(WG_{id}, WG_0)$, $\delta_\nu(G_{id}, G_0)$ are summarized in Table 1 below. The corresponding results of the OE model are also included for comparison. It is clear that the RCID method gives models with much smaller $\delta_\nu(WG_{id}, WG_0)$ value than the model from the OE method.

The identification results with noisy input and output data are examined next. Two sequences of white noise with a zero mean and a standard deviation of 0.3 are added to both the input u and the output y. A model $G_{id3}$ is identified using the weighting function W=0.1/s:

$$G_{id3}(s) = \frac{-0.0306s + 0.0116}{s^2 + 0.0145s + 0.0095}. \quad (53)$$

Figure 13:
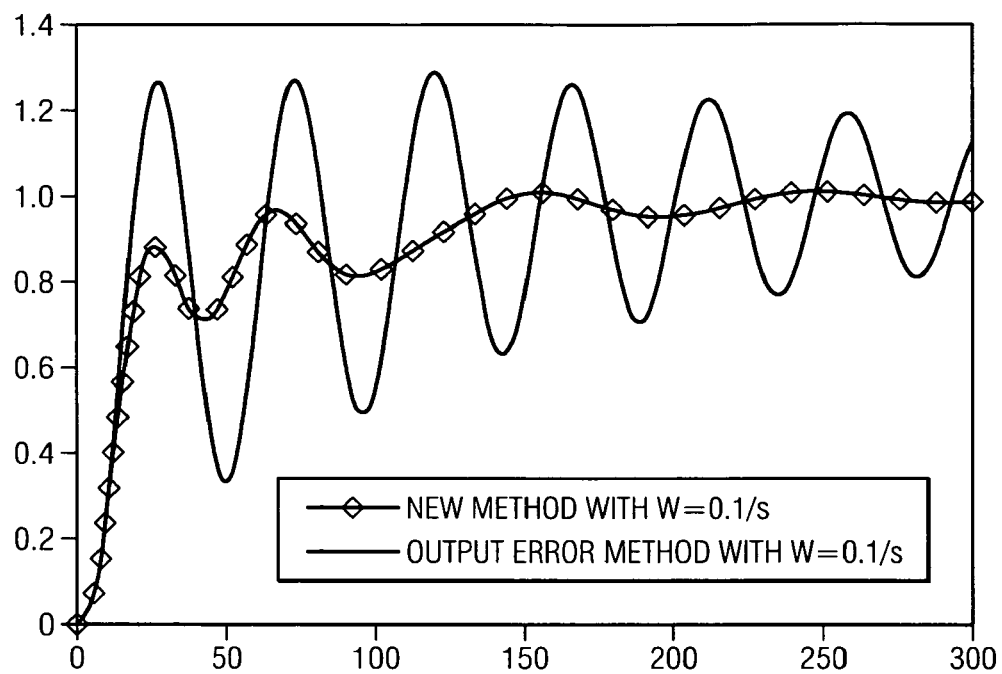

The closed-loop response of the corresponding optimal controller and the optimal controller designed based on the OE model are shown in FIG. 13. Again, the closed-loop bandwidth can be increased by changing the weighting function to W=1/s and by repeating the identification to identify a model $G_{id4}$:

$$G_{id4}(s) = \frac{-0.01s + 0.0049}{s^2 - 0.0001s + 0.0304}. \quad (54)$$

In the case of the model $G_{id4}$, $\epsilon_{max} \ll \epsilon_{unc}$, meaning that even the optimal controller cannot handle the uncertain system. Thus, the identified model $G_{id4}$ cannot be used for controller design, and the control objective could be modified or identification data can be collected under less noisy conditions (the latter might not be possible, either because of the typical noise level in the system or because of perturbations caused by nonlinear components). Again, estimated data for the models $G_{id3}$ and $G_{id4}$ is summarized in Table 1.

TABLE 1

| | Data | | | |
|---|---|---|---|---|
| | Clean | | Noisy | |
| | Weighting | | | |
| | 0.1/1 | 1/s | 0.1/1 | 1/s |
| | Identified Model $G_{id}$ | | | |
| | $G_{id1}$ | $G_{id2}$ | $G_{id3}$ | $G_{id4}$ |
| Est. $\epsilon_{unc}$ | 0.1288 | 0.0481 | 0.2325 | 0.6110 |
| $\epsilon_{max}(WG_{id})$ | 0.2726 | 0.1654 | 0.2923 | 0.2905 |
| $\delta_\nu(WG_{id}, WG_0)$ | 0.0930 | 0.0587 | 0.1923 | 0.4007 |
| $\delta_\nu(G_{id}, G_0)$ | 0.3033 | 0.3149 | 0.3387 | 0.9929 |
| $\epsilon_{max}(WG_{oe})$ | 0.3102 | 0.2505 | 0.3130 | 0.2590 |
| $\delta_\nu(WG_{oe}, WG_0)$ | 0.2536 | 0.3563 | 0.2676 | 0.3926 |
| $\delta_\nu(G_{oe}, G_0)$ | 0.3580 | 0.3580 | 0.3611 | 0.3611 |

It may be noted that the estimated NCF uncertainty increases as the noise level in the data increases. In general, there might be no easy way to separate the additive noise from the model dynamics mismatch in the error residue. By assuming all of the errors are caused by model dynamics mismatch, the NCF uncertainty estimation result $\epsilon_{unc}$ may be more conservative in the presence of the additive noise. In the method 400, the noise effect is bounded within the model uncertainty. However, if it still happens that $\epsilon_{max} > \epsilon_{unc}$, such a model can still produce a successful controller design.

Although FIGS. 3 through 13 illustrate one example of a method for system identification and loop-shaping controller design, various changes may be made to FIGS. 3 through 13. For example, while shown as a series of steps in FIG. 4, various steps in the method 400 could overlap, occur in parallel, occur multiple times, or occur in a different order. As a particular example, steps 420-422 could be moved before step 416 or before step 418. Also, the number of bandpass filters in the filter bank could vary depending on the implementation. Further, the graphs shown in FIGS. 6A through 13 are for illustration only. In addition, various equations and other details have been provided above regarding the operation or validation of the method 400. These details are for illustration and explanation only, and other embodiments of the method 400 could be used that depart from these details.

FIGS. 14 through 22 illustrate a second example method for system identification and loop-shaping controller design according to this disclosure. This method could, for example, be performed by the tool 144 in the process control system of FIG. 1 (or by any other device or in any other system). The embodiment of the method shown in FIGS. 14 through 22 is for illustration only. Other embodiments could be used without departing from the scope of this disclosure.

This method generally involves determining a higher-order model and then performing robust control-oriented model order reduction to minimize NCF uncertainty. For example, higher-order auto-regression with exogenous input (ARX) model identification can be used to reduce the effective size of $\Phi_d$ (the power spectrum of the disturbance d). Also, the weighting functions $W_4$ and $W_2$ can be selected without requiring the use of a preliminary model, which helps to provide for the automated design the weighting functions. Again, the identified model can then be used to perform controller design.

Figure 14:
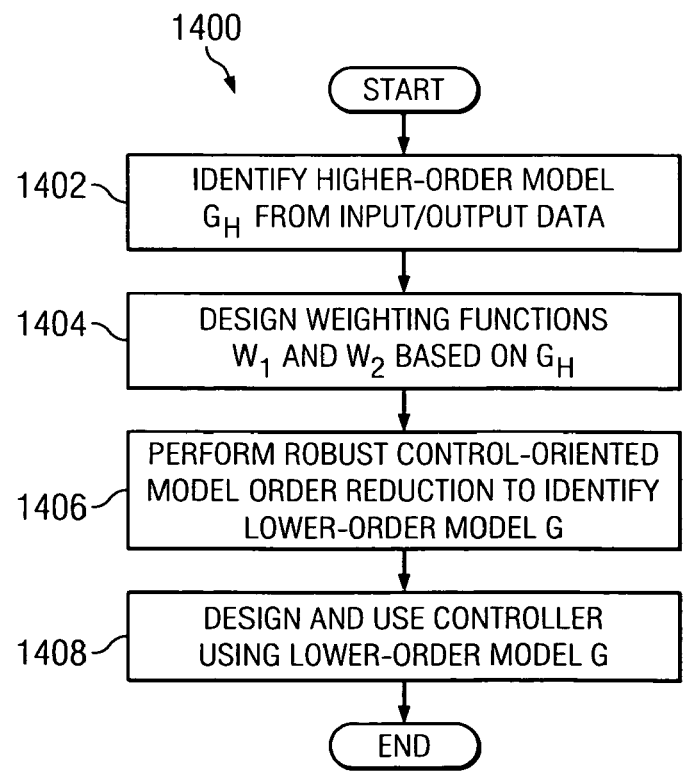
FIGS. 14 through 22 illustrate a second example method for system identification and loop-shaping controller design according to this disclosure.

FIG. 14 illustrates an example method 1400 for system identification and loop-shaping controller design. In this example embodiment, the method 1400 includes identifying a higher-order model $G_H$ at step 1402. This may include, for example, engaging in ARX model identification to identify a higher-order ARX model. The ARX model structure has the form:

$$A(z) \cdot y(t) = B(z) \cdot u(t) + e(t) \quad (55)$$

where:

$$A(z) = 1 + a_1 z^{-1} + \ldots + a_{n_a} z^{-n_a} \quad (56)$$

$$B(z) = 1 + b_1 z^{-1} + \ldots + b_{n_b} z^{-n_b} \quad (57)$$

The identified higher-order ARX model can be denoted as $G_H = B_H/A_H$. As a particular example, a higher-order ARX model can be identified as a $30^{th}$-order model expressed as:

$$y(t) = \frac{b_1 q^{-1} + \ldots + b_{30} q^{-30}}{1 + a_1 q^{-1} + \ldots + a_{30} q^{-30}} u(t) + \frac{1}{1 + a_1 q^{-1} + \ldots + a_{30} q^{-30}} e(t). \quad (58)$$

The ARX model is generally simple in structure, and the ARX model identification problem can be formulated as a least squares problem (so it can be solved easily and reliably). However, a lower-order ARX model is known to be a biased model structure, generally leading to inconsistent model results. On the other hand, ARX models are generally capable of representing any linear system arbitrarily well provided that the model order is high enough. Since the higher-order ARX model is effectively an unbiased model structure, its model error may only come from variance. The asymptotic variance of an ARX model can be expressed as:

$$\text{var}(G_H(jw)) \approx \frac{\eta}{N} \frac{\Phi_d(w)}{\Phi_u(w)} \quad (59)$$

where $\eta$ represents the model order and N is the length of the experimental data (such as the number of samples). Based on this, a $3\sigma$ upper bound for the error of $G_H$ can be expressed as:

$$|G_H(jw) - G_0(jw)| \leq 3 \sqrt{\frac{\eta}{N} \frac{\Phi_d(w)}{\Phi_u(w)}} \; w.p. \geq 99\%. \quad (60)$$

This approach can therefore yield a system identification procedure in $L_2$, and it also has the ability to discriminate between exogenous (stochastic) disturbances and unmodeled dynamics.

Weighting functions are then designed using the higher-order model at step 1404. The weighting functions can be selected to satisfy both controller performance and robustness requirements. Performance requirements could relate to disturbance rejection and closed-loop bandwidth, such as a requirement that the gain of a weighted system $W_2 G_H W_1$ (denoted $\sigma(W_2 G_H W_1)$) is large at frequencies where significant noise attenuation is required so that disturbances are effectively rejected. Robustness requirements could include finding weightings so that $\delta_{L_2}(W_2 G_H W_1, W_2 G_0 W_1)$ is sufficiently small. Since a weighted higher-order model $G_{HS}$ (equal to $W_2 G_H W_1$) can be readily calculated, a check of the performance requirement can be straightforward. For the robustness requirement, the following can be expressed:

$$\delta_{L_2}(G_{HS}, G_{0S}) = \|M_{HS} W_2 (G_H - G_0) W_1 M_{0s}\|_\infty \tag{61}$$

where $(N_{HS}, M_{HS})$ is the NCF of $G_{HS}$, and $(N_{0S}, M_{0S})$ is the NCF of $G_{0S}$. Without knowing the true system, Equation (61) can be approximately evaluated. It may be noted that the asymptotic result in Equation (60) can be used to obtain an upper bound of $|G_H - G_0|$. To estimate $M_{0s}$, the following can be used:

$$M_{0s}^* M_{0s} = (I + G_{0s} G_{0s}^*)^{-1} \tag{62}$$

The following power spectrum relationship of the weighted system $G_{OS}$ can then be obtained:

$$\Phi_{ys}(w) = |G_{0s}(jw)|^2 \Phi_{us}(w) + \Phi_{ds}(w) \tag{63}$$

$$\frac{\Phi_{us}(w)}{\Phi_{us}(w) + \Phi_{ys}(w)} = \frac{1}{1 + |G_{0s}(jw)|^2 + \frac{\Phi_{ds}(w)}{\Phi_{us}(w)}}. \tag{64}$$

From Equations (62) and (64), it follows that $|M_{0s}(jw)|$ can be estimated as:

$$|M_{0s}(jw)| = \sqrt{\frac{\Phi_{us}(w)}{\Phi_{us}(w) + \Phi_{ys}(w)}}. \tag{65}$$

Assuming the signal-to-noise ratio is large, the error in this estimate may be small. In many practical situations, only time-domain data of the original system may be available, so the input and output data of the weighted system can be calculated as $u_s = W_1^{-1} u$ and $y_s = W_2 y$. The band-pass filter bank described above in FIG. 5 can be applied to the time-domain data in this method 1400 to produce an estimate of the power spectrum at different frequencies.

The design of the weighting functions may therefore involve the following. It is assumed that the basic format of the weighing functions is known with a few tunable parameters. The appropriate values of the parameters can be determined by validating through the performance and robustness requirements as discussed above. For example, $W = w_c/s$ could be used as the weighting function, where $w_c$ is a tunable parameter affecting the closed-loop bandwidth. The objective of the weighting function design may be to find the desired bandwidth that the controller can push to with a sufficient robust stability margin.

A robust control-oriented model order reduction is performed to identify a lower-order model at step 1406, and the controller can be designed at step 1408 (such as by selecting proper parameters for the controller using the identified lower-order model). The standard weighted $L_2$-norm model order reduction problem can be expressed as:

$$\min_{G \in S} \int_{-\pi}^{\pi} |[G(jw) - G_H(jw)] W(w)|^2 dw. \tag{66}$$

Equation (66) generally attempts to find a lower-order model G by minimizing the frequency-weighted open-loop distance between G and $G_H$. However, systems with similar open-loop behavior in an $L_2$ sense may have very different closed-loop behavior. In this step, G can be obtained by minimizing the weighted $L_2$-gap to the higher-order model as follows:

$$\min_{G \in S} \delta_{L_2}(W_2 G_H W_1, W_2 G W_1). \tag{67}$$

A numeric approach can be taken here. For example, a random noise sequence can be used as input $u_H$, and the output response can be simulated as $y_H = G_H u_H$. A lower-order model $G_L$ can then be determined using $u_H$, $y_H$, $W_1$, and $W_2$ by solving Equation (12) using the method 400 described above. The resulting model $G_L$ may have a minimum $\delta_{L_2}(W_2 G_H W_1, W_2 G_L W_1)$ since there is no additive noise in the regenerated data $u_H$ and $y_H$.

The model G is identified by minimizing $\delta_{L_2}(G_S, G_{HS})$ in the model reduction step. Ideally, the value of $\delta_{L_2}(G_S, G_{0S})$ would be minimized. Since $G_H$ approaches $G_0$ asymptotically, the value of G from Equation (67) is an unbiased estimate of the true optimal solution given in Equation (47). A bound on the additional error incurred due to the use of the higher-order ARX model can be obtained by using Equation (60) and can be expressed as:

$$|\delta_{L_2}(G_s, G_{0s}) - \delta_{L_2}(G_s, G_{Hs})| \leq \delta_{L_2}(G_{Hs}, G_{0s}) \leq \tag{68}$$

$$3\sqrt{\frac{\eta}{N}} \left\| M_{Hs} W_2 \sqrt{\frac{\Phi_d(w)}{\Phi_u(w)}} W_1 M_{0s} \right\|_\infty \quad w.p. \geq 99\%$$

From Equation (68), it is expected that $|\delta_{L_2}(G_s, G_{0s}) - \delta_{L_2}(G_s, G_{Hs})|$ approaches zero with the experiment data length N in the rate of $$\sqrt{\frac{1}{N}}.$$

It may also be noted that the weighting functions can be explicitly chosen to make the estimated $\delta_{L_2}(G_{Hs}, G_{0s})$ small. This analysis indicates that, for high enough orders, the $\delta_{L_2}$ distance between the lower-order and higher-order estimates is approximately the same as the distance between the lower-order estimate and true system. One advantage over a single-step estimation of the lower-order system is that these estimates are unbiased.

As an example of this method 1400 in use, consider the following system to be identified:

$$G_0(s) = \frac{.0001 \cdot (.001875s^6 - .002946s^5 + .01265s^4 - .03552s^3 + .03498s^2 - .2259s + .7685)}{s^7 + 3.47s^6 + 4.044s^5 + 1.8895s^4 + .4251s^3 + .0496s^2 + .0029s + .0000677} \quad (72)$$

The system identification objective is to identify a second-order model, based on which a robust controller is obtained using the loop-shaping controller design procedure. The method 1400 is denoted as a robust control identification method (RCID) below, and its results are compared to other standard methods, namely the output error (OE), Box-Jenkins (BJ), and asymptotic (ASYM) methods. The OE and BJ methods are PEM methods that use the output error model structure and Box-Jenkins model structure, respectively. In the ASYM method, a higher-order ARX model is identified, and then the model reduction problem shown in Equation (66) is performed, where the weighting function is chosen as:

$$W(w) = |A_H(e^{jw})|^2 \Phi_u(w). \quad (73)$$

A generalized binary noise (GBN) signal is used as the input test signal u to the process, with a switching time of ten seconds and the probability of a switch at 0.2. A disturbance is added to the output as:

$$y = G_0(s)u + G_d(s)d \quad (74)$$

$$G_d(s) = \frac{50}{1000s + 1}. \quad (75)$$

Figure 15:
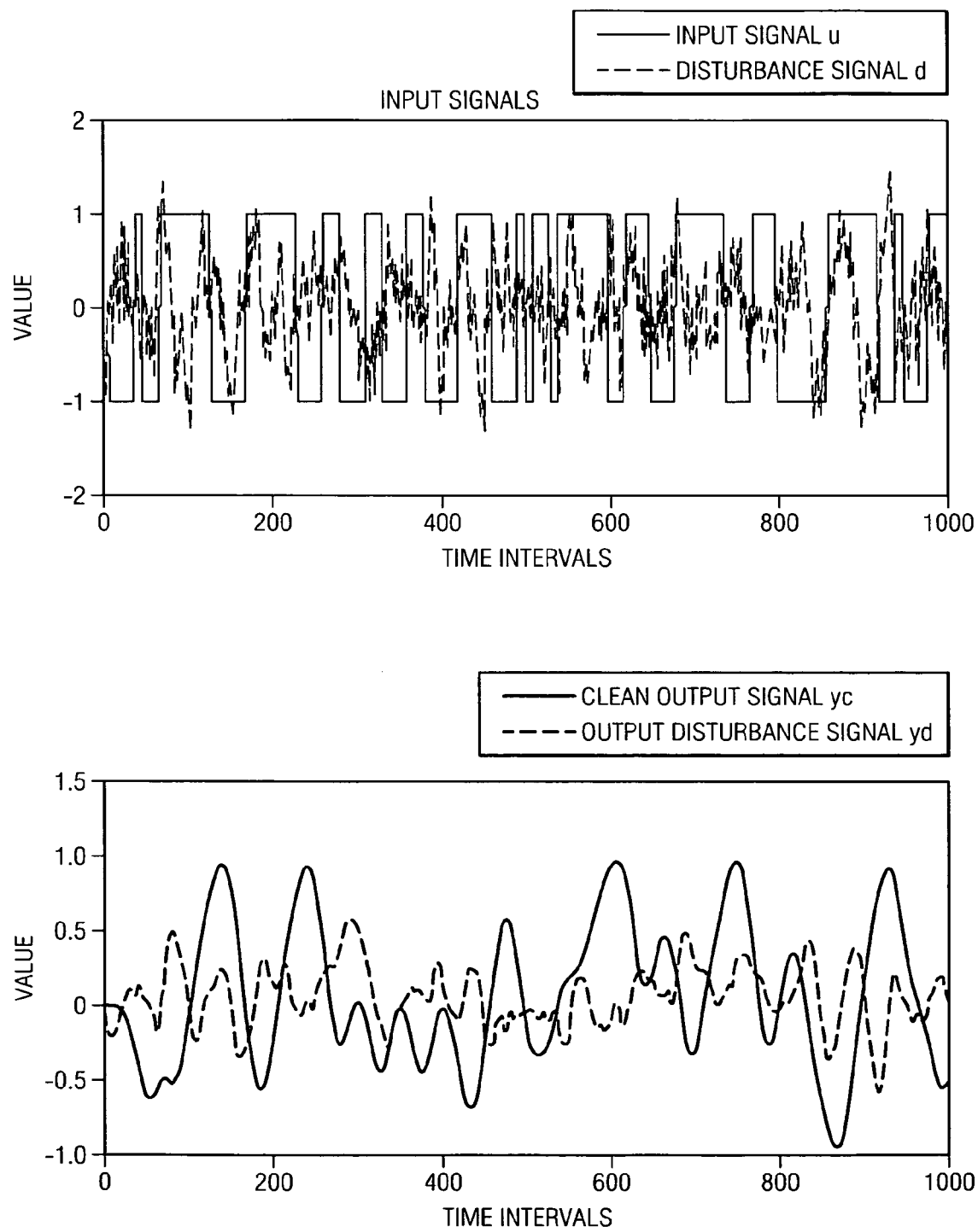

The energy of disturbance d is bounded by:

$$W_I(jw) = \frac{10jw + 0.2}{5jw + 1} \quad (76)$$

to the input signal u: $|d(w)| \leq |W_1(jw)||u(w)|$. The disturbance d is generated in the following way. First, compute u(w) from u(t) using a fast Fourier transform (FFT). Second, at each frequency point, generate d (w) as $d(w)=\text{rand}|W_1(jw)||u(w)|$, where rand is a random number between −1 and 1 with a uniform distribution. Third, calculate d(t) from d(w) using an inverse fast Fourier transform (IFFT). In this simulation, a total of one thousand experimental data points are collected with a sampling rate one sample per second. An example of the input signal u, the disturbance signal d, the corresponding clean output signal $y_c = G_0(s)$ u, and the output disturbance signal $y_d = G_d(s)d$ are shown in FIG. 15.

Figure 16A:
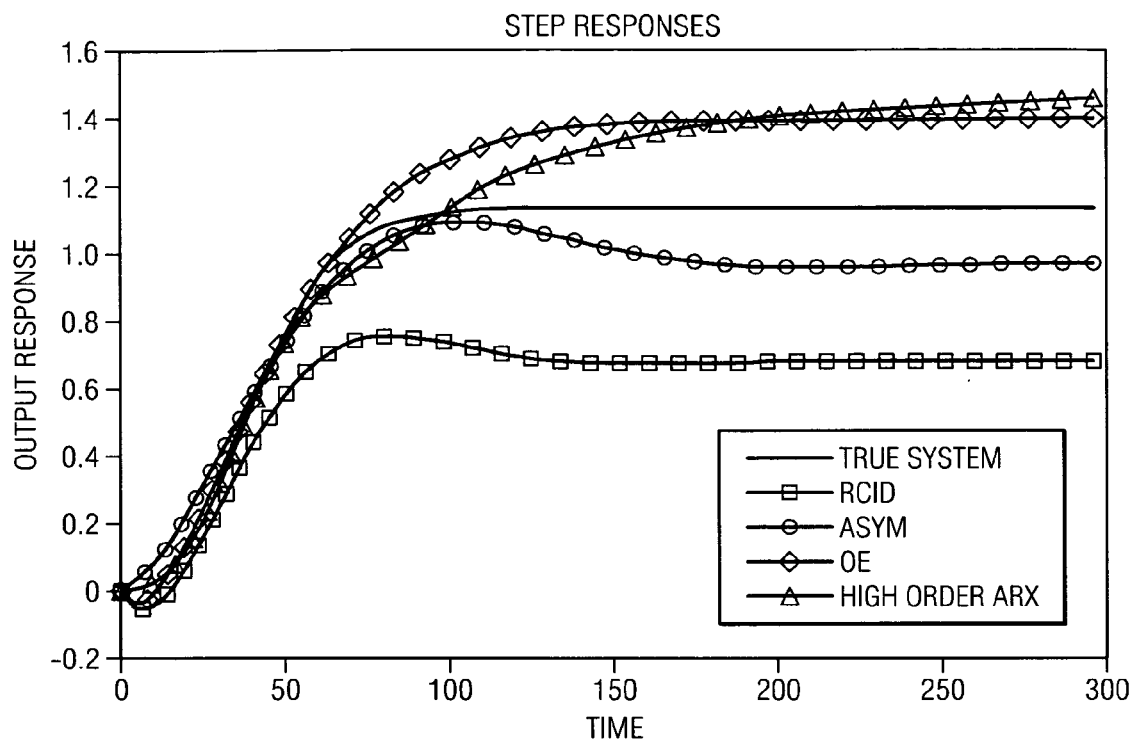
Figure 16B:
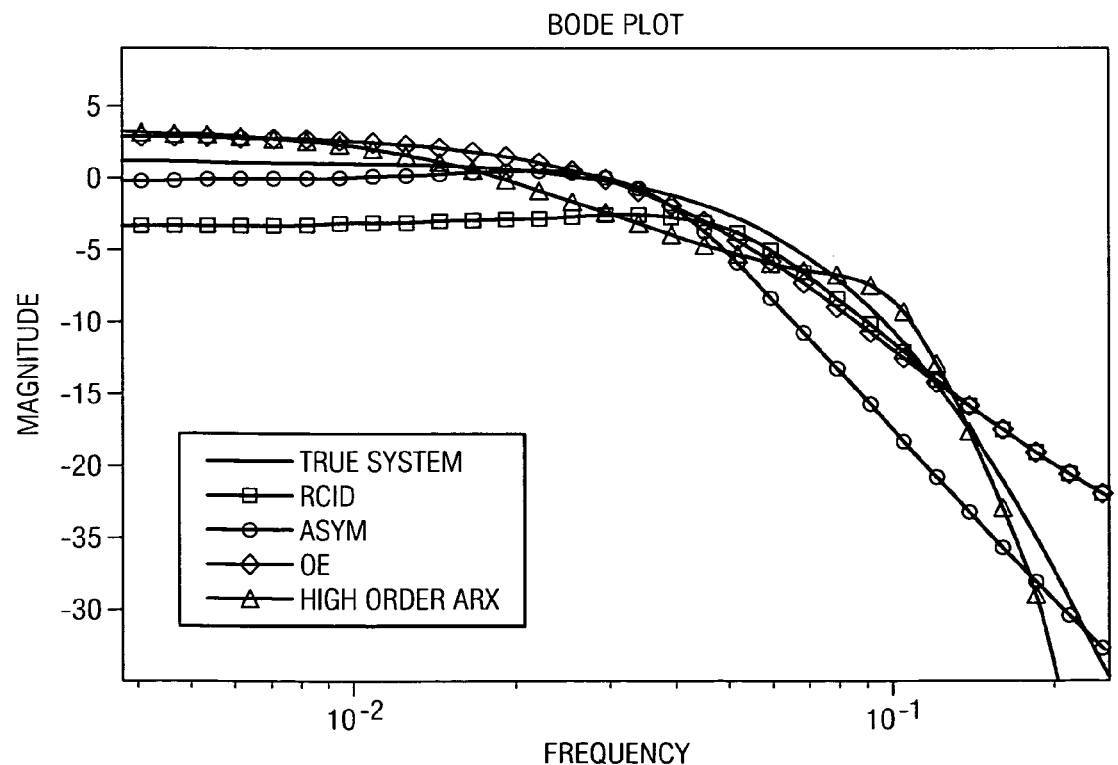
Figure 17:
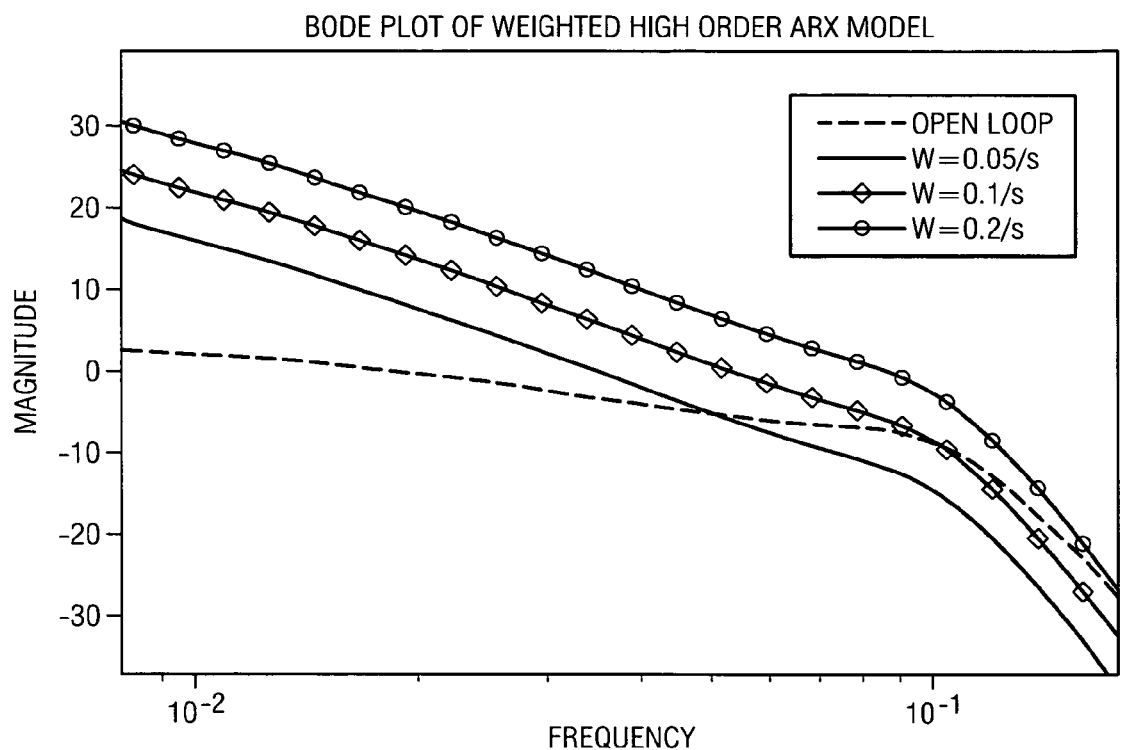
Figure 18:
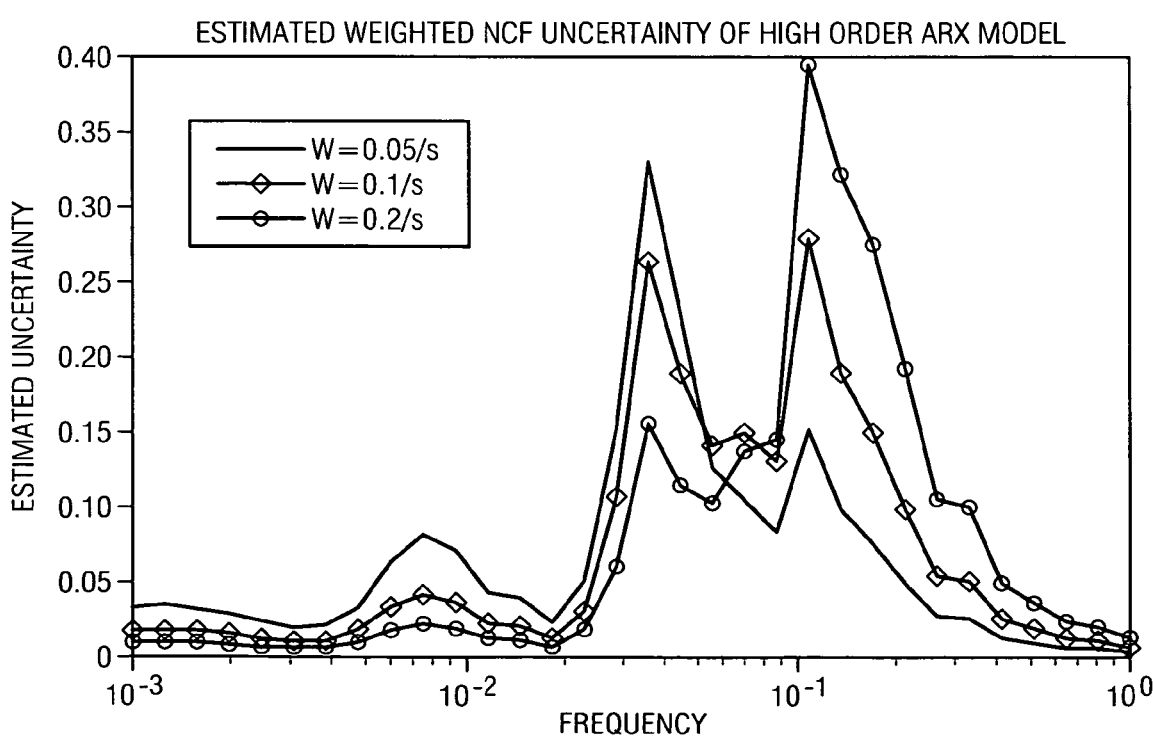

A $30^{th}$-order ARX model is identified during the higher-order model identification step. The step responses and Bode plots of the original system $G_0(s)$, the ARX model, and subsequent models (described below) are shown in FIGS. 16A and 16B for comparison. In a typical application, a feasible estimate of the desired closed-loop bandwidth is known beforehand. Following the optimal loop-shaping controller design approach, the initial weighting functions $W_1$ and $W_2$ are designed to shape $G_H$ so that the controller performance requirements can be met. For example, with a bandwidth requirement of $w_B > 0.03$ and a simple weighting function $W = w_c/s$, the value of $w_c$ can be found so that the gain crossover frequency of $WG_H$ satisfies the bandwidth requirement. The Bode plots of $WG_H$ with W=0.2/s, 0.1/s, and 0.05/s are shown in FIG. 17, from which it can be seen that $w_c \geq 0.05$ satisfies the performance requirement.

For the robustness requirement, the weighted NCF uncertainty can be estimated with W and $G_H$ using the approach described above with respect to the method 400. The estimated weighted NCF uncertainty of $G_H$ with $w_c$=0.2, 0.1, and 0.05 are plotted in FIG. 18. In this case, a value of $w_c$=0.1 can be comfortably chosen since it gives a smaller estimated uncertainty. It may be pointed out that increasing the order of the weighting function provides a possible avenue to maximize bandwidth, but it could be treated as a last resort and only for cases where long data records are available. This is because the exact shape of the uncertainty estimates is data-dependent. Also, uncertainty constraints may enter both in terms of a maximum bandwidth and a minimum bandwidth. Intuitively, increasing the loop gain may be constrained by the ever-present high frequency uncertainty. Its low frequency counterpart can be observed in unstable or marginally stable systems (integrators) where the low frequency information is uncertain and a minimum controller bandwidth is required to achieve the stabilization of the nominal system.

Next, the model reduction problem in Equation (67) is solved to get a second-order model, denoted $G_{rcid}$. As a comparison, models are also identified using the OE and ASYM methods, denoted as $G_{oe}$ and $G_{asym}$, respectively. The step responses and bode plots of all the identified models are shown in FIGS. 16A and 16B.

For lower-order model candidates, it is useful to observe how the modeling error is addressed using knowledge of the actual system. Looking at the output disturbance first, the norm of the actual disturbance signal is 6.7439 in this example. The open-loop prediction error residue is calculated as $e = y - G_{id}u$. The norms of the prediction error residue for the identified models are: norm($e_{rcid}$)=8.4497, norm($e_{oe}$)= 7.0228, and norm($e_{asym}$)=8.5853. Obviously, the output error method gives the smallest output prediction error, which is the optimization objective of that method. On the other hand, the actual v-gap can also be calculated between the weighted identified model and the weighted real system. The results in this example are: $\delta_v(WG_0, WG_{rcid})$=0.0999, $\delta_v(WG_0, WG_{oe})$=0.14, and $\delta_v(WG_0, WG_{asym})$=0.3089. Here, the RCID method yields the smallest weighted v-gap of all the three methods. It may also be noted that although the prediction error norms of $G_{rcid}$ and $G_{asym}$ are similar, $G_{rcid}$ gives a significantly smaller weighted v-gap to the true system.

Figure 19A:
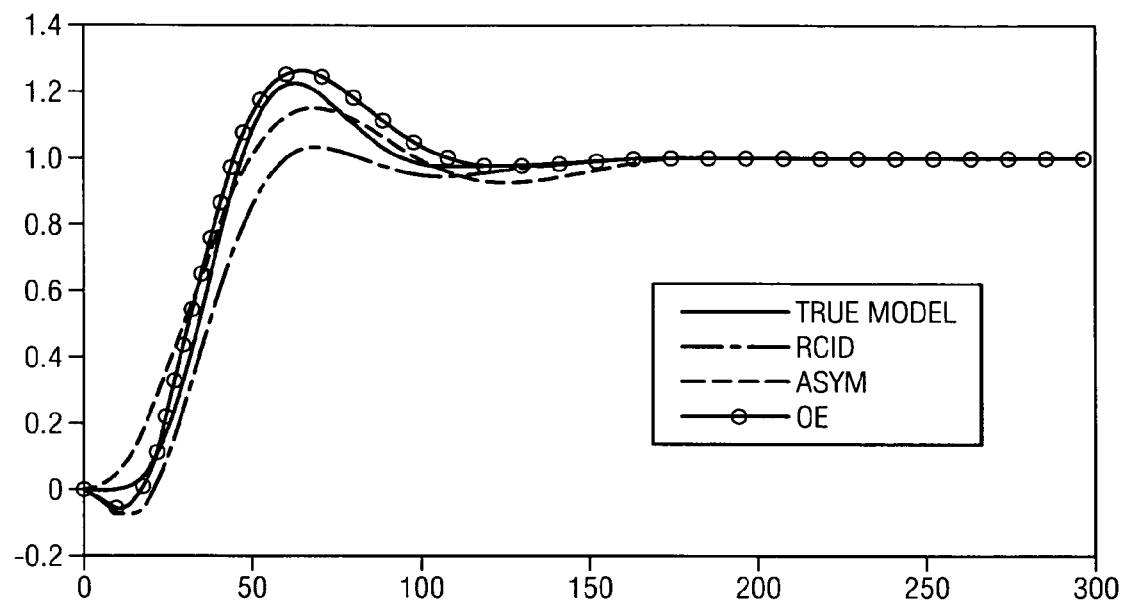
Figure 19B:
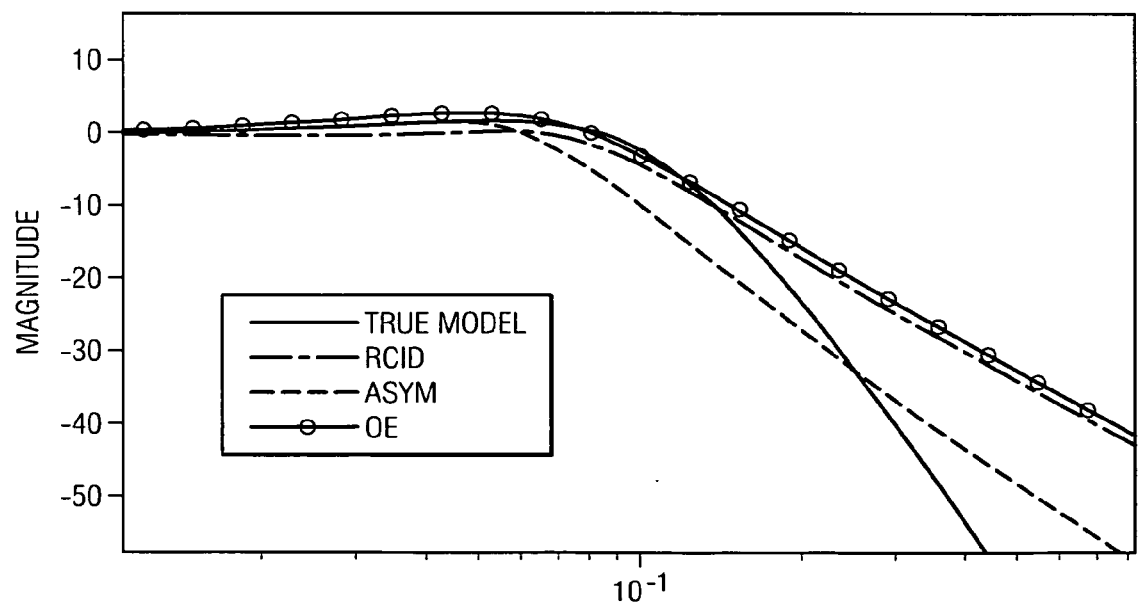

The significance of the v-gap results becomes apparent in this example when the closed-loop responses are considered. A loop-shaping optimal controller can be constructed for each lower-order model with the weighting W=0.1/s. Denote the controllers as $K_{oe}$, $K_{rcid}$, and $K_{asym}$. An "ideal" controller (denoted as $K_0$) is also calculated based on the true system and the weighting, and the corresponding closed-loop system is referred to as the "ideal" closed-loop system. The designed controllers are first applied to the corresponding identified nominal models. The setpoint tracking and the frequency responses of the different nominal closed-loop systems (complementary sensitivity) are shown in FIGS. 19A and 19B, respectively. Note that the nominal systems exhibit similar behavior since they are designed for the same loop-shaping weight, with small variations due to the model differences.

Figure 20A:
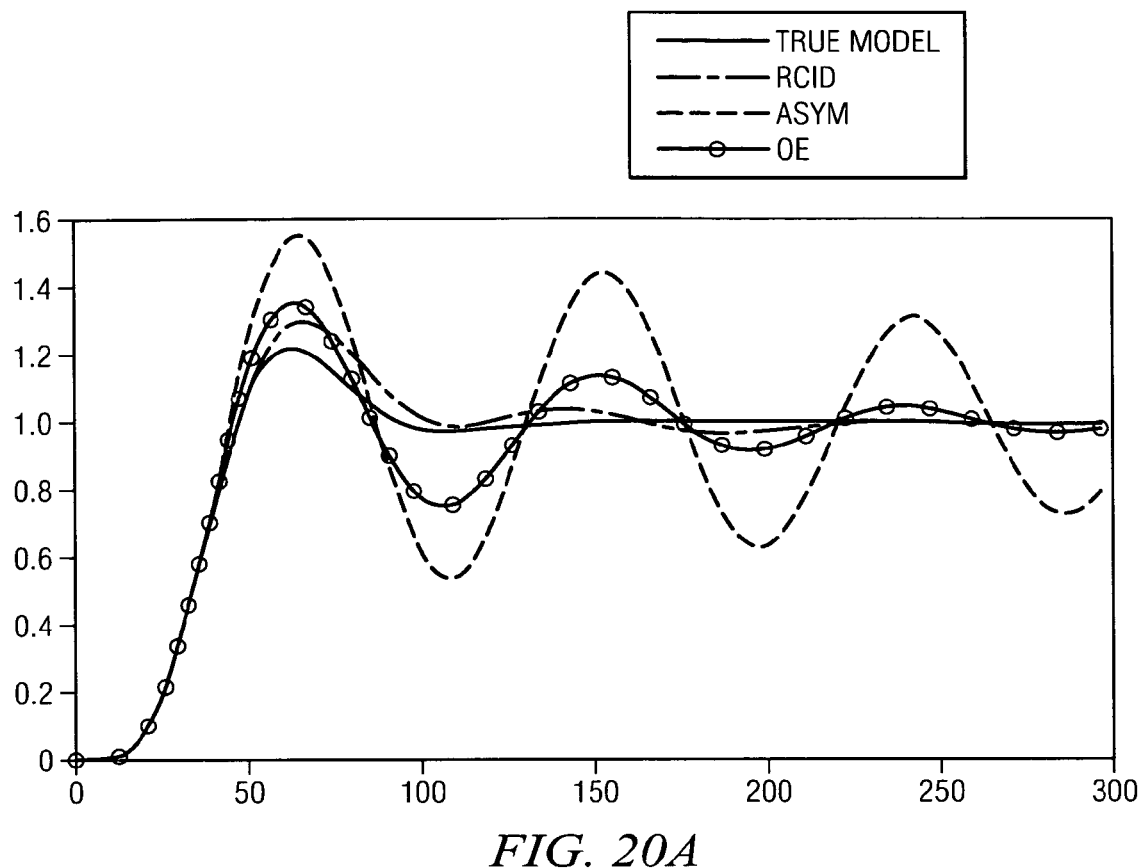
Figure 20B:
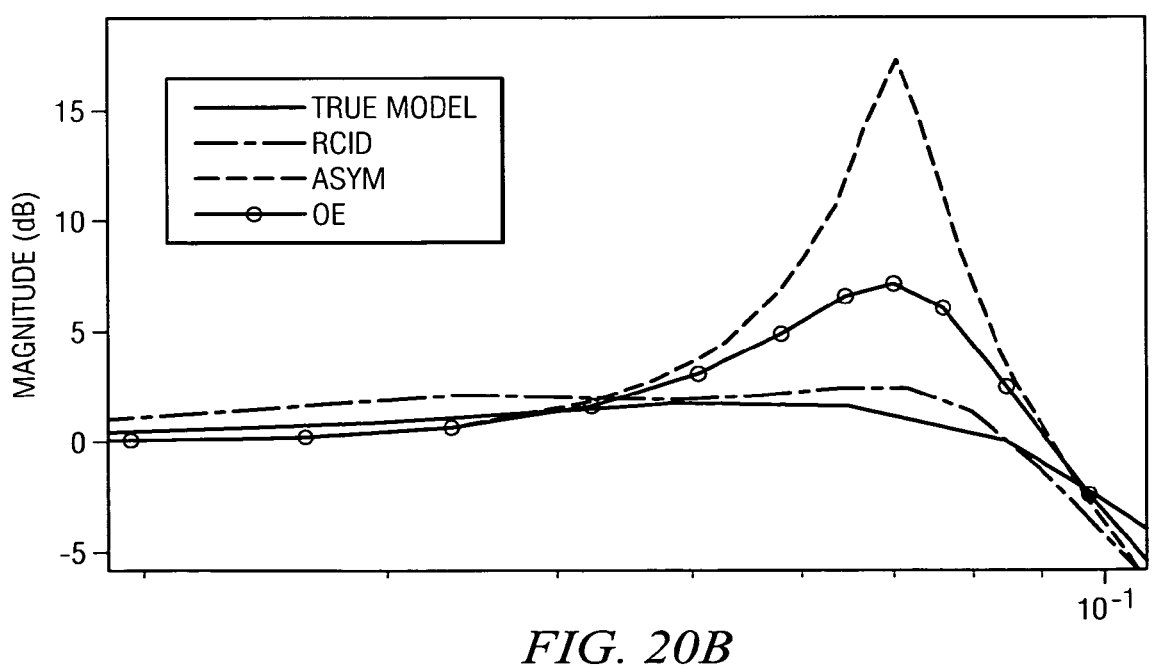
Figure 21A:
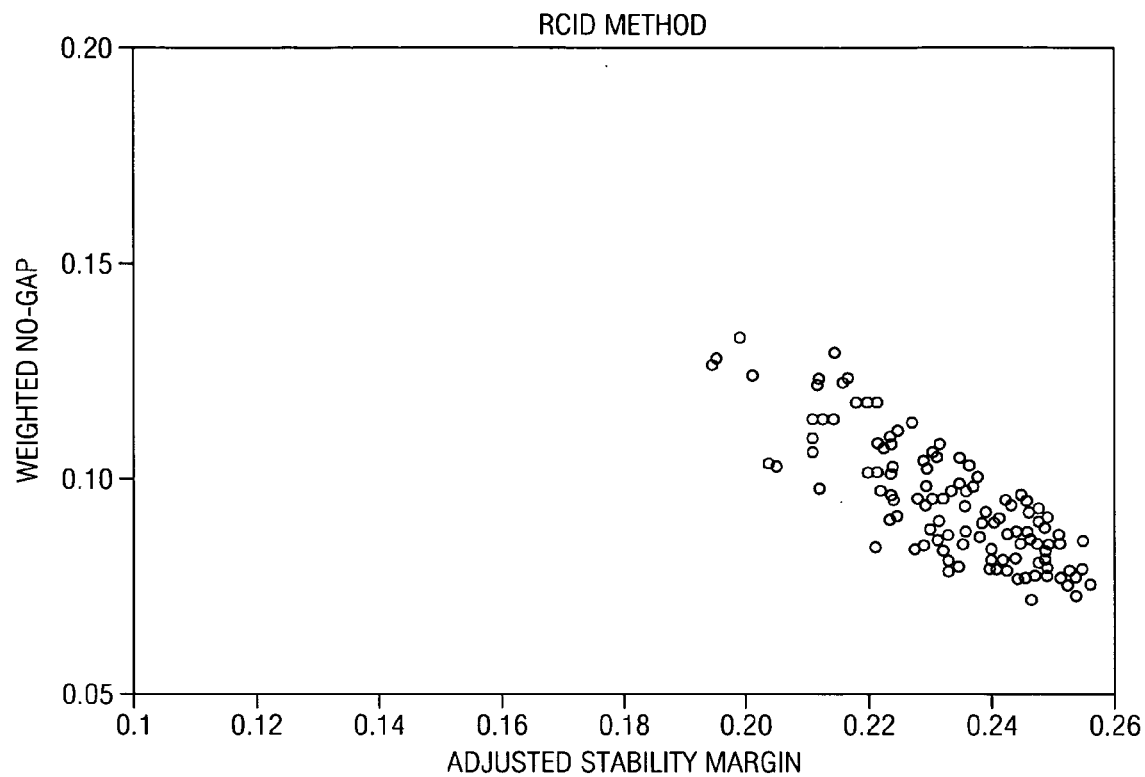
Figure 21B:
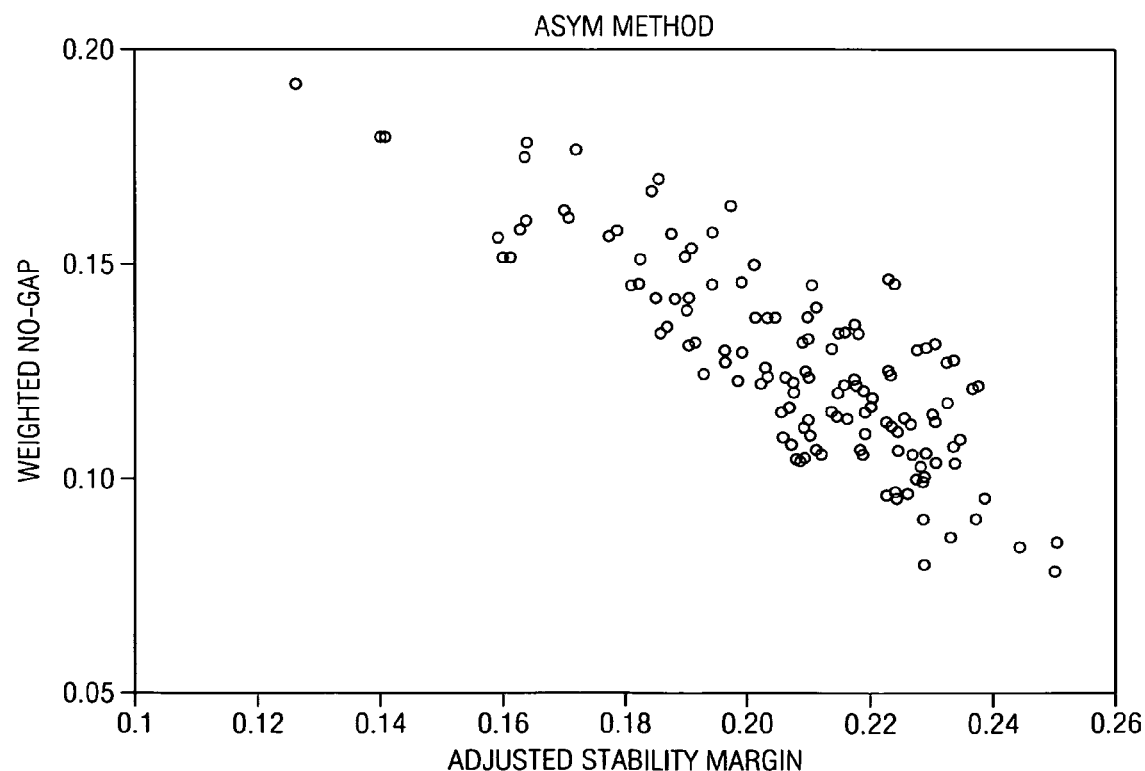
Figure 21C:
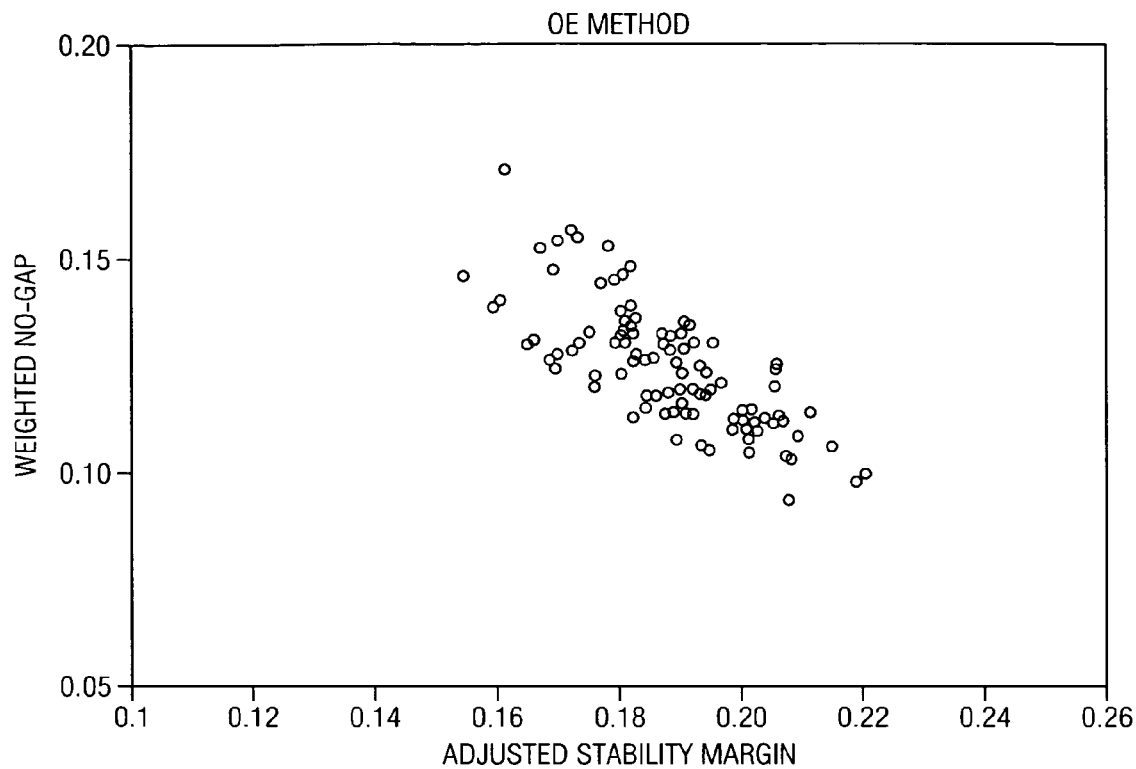
Figure 21D:
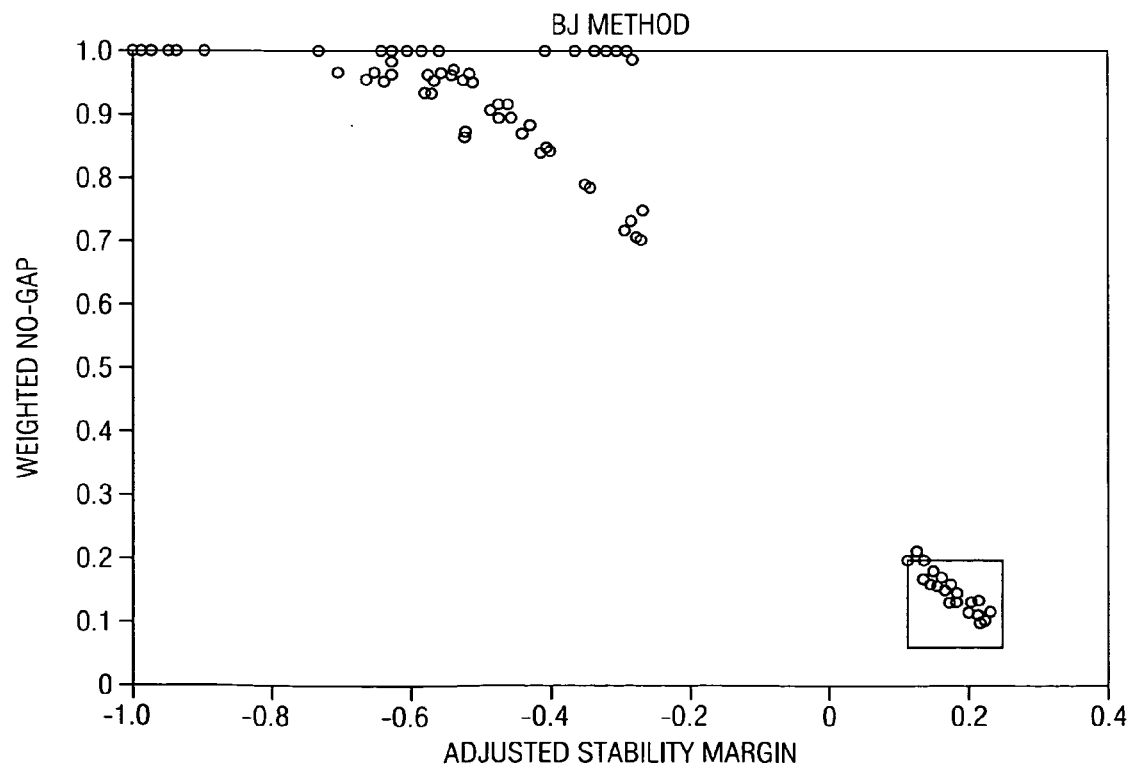
Figure 22A:
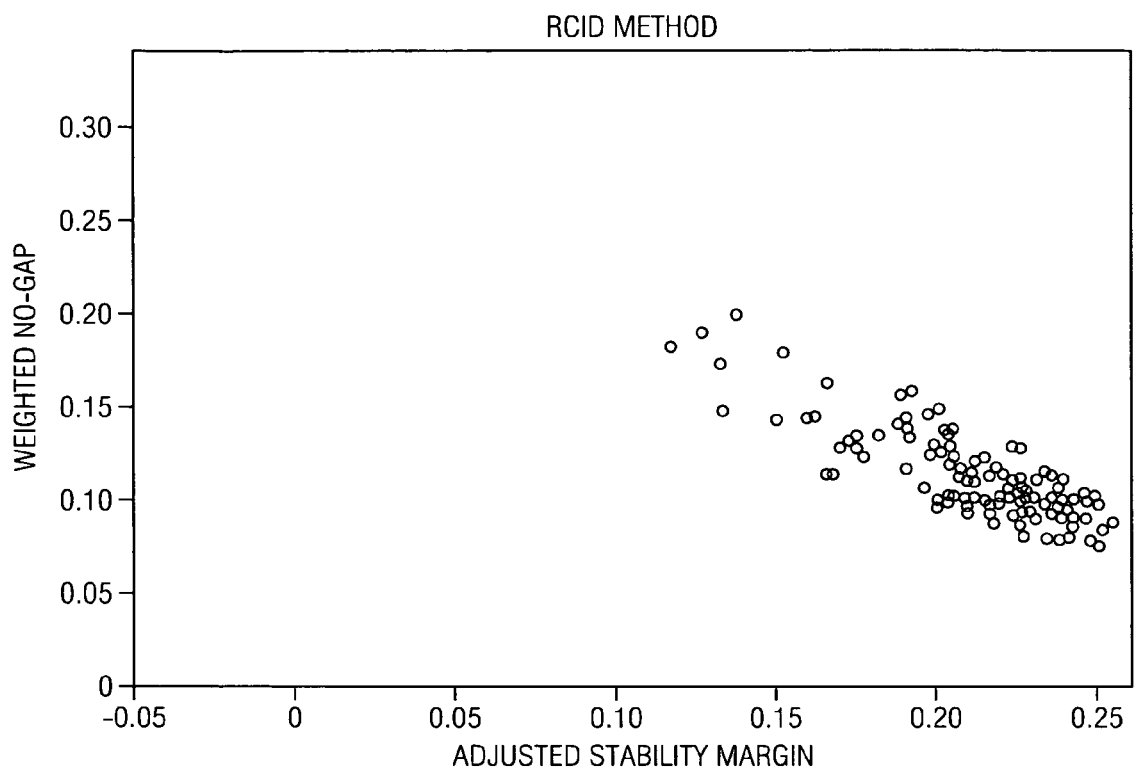
Figure 22B:
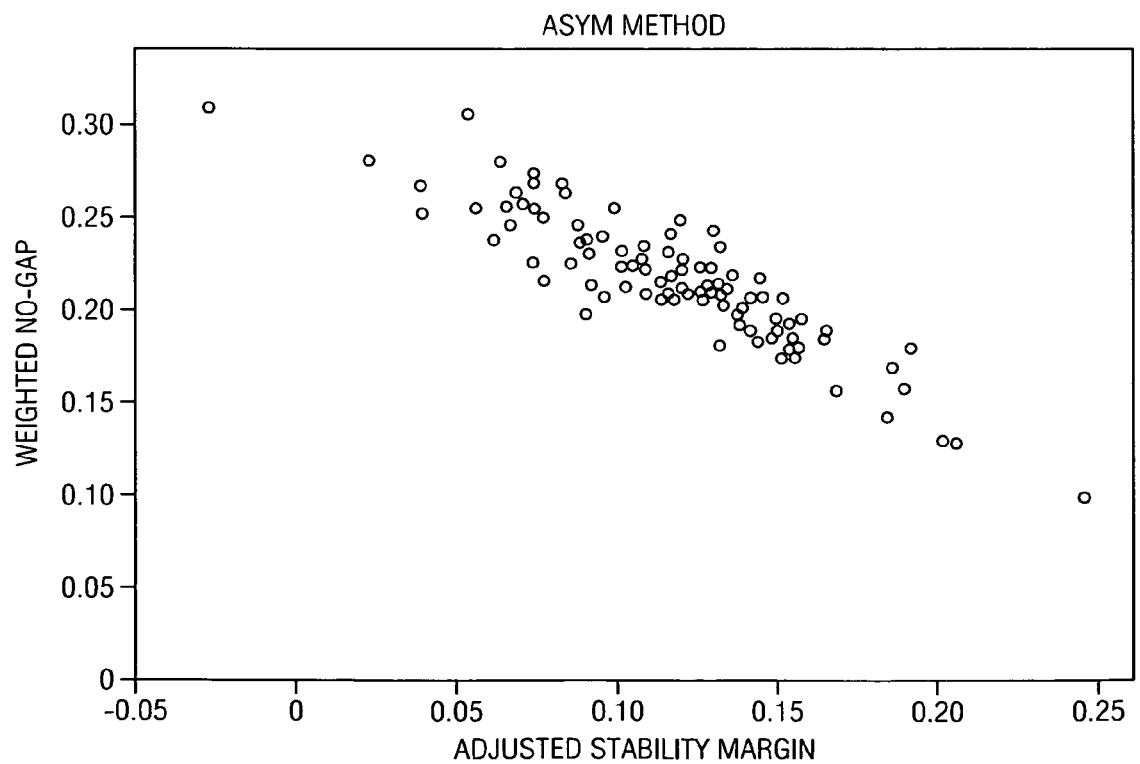
Figure 22C:
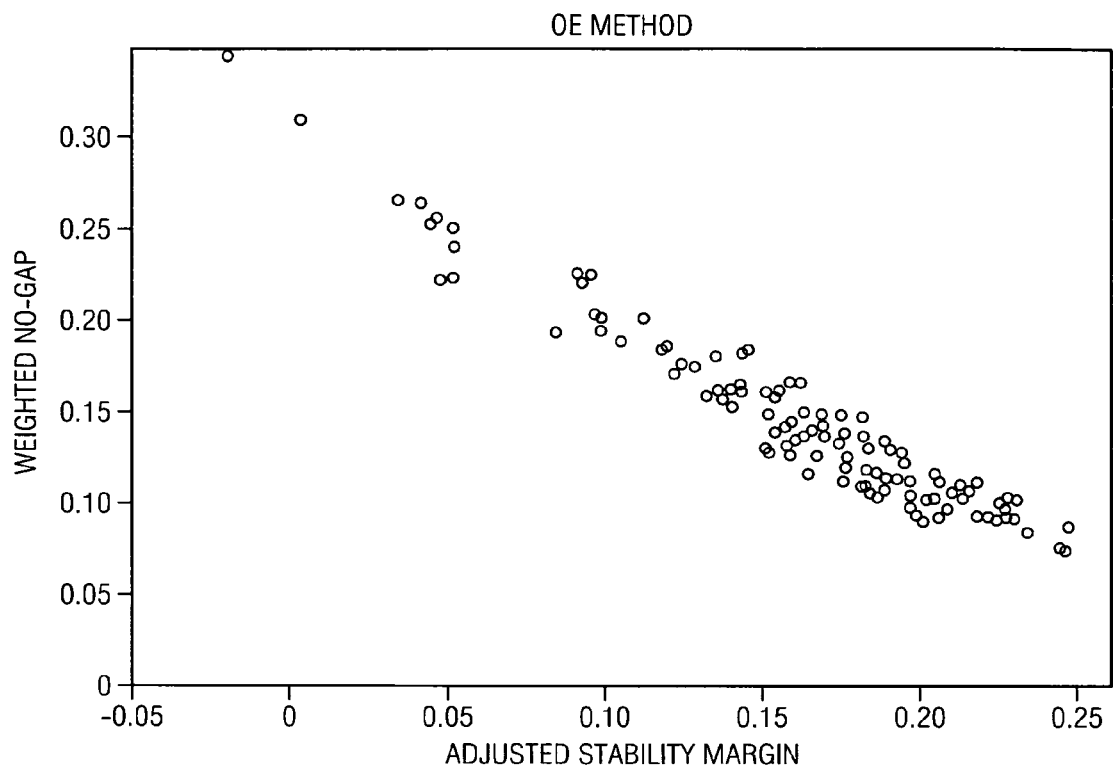
Figure 22D:
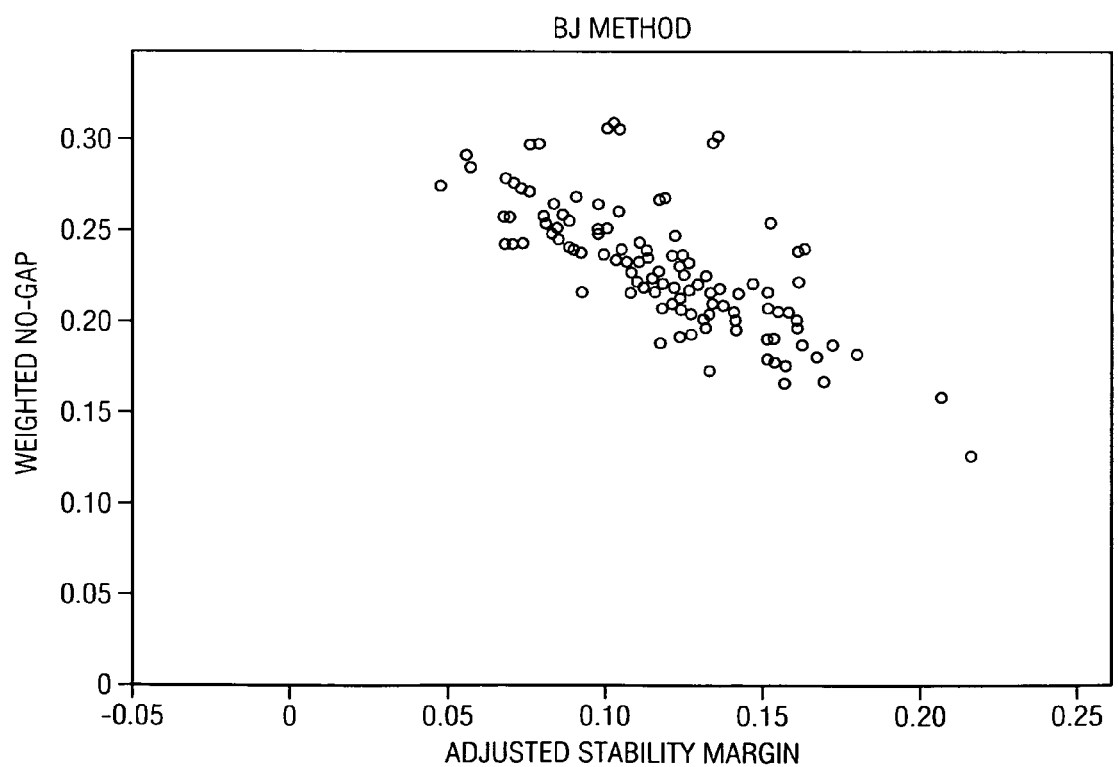

Each controller can then be used to compute the closed-loop response with the original (true) system $G_0(s)$. This can be done to determine how close these responses will be to the true system. The setpoint tracking of the different closed-loop systems is shown in FIG. 20A. Comparing this to FIG. 19A, it appears that the controller $K_{rcid}$ provides the most consistent performance when applied to $G_0$. A similar conclusion is drawn from the corresponding Bode plots of complementary sensitivities shown in FIG. 20B when compared to their predicted counterparts in FIG. 19B. The advantage of the method 1400 for performing identification by minimizing the weighted coprime factor uncertainty is illustrated by this comparison. The closed-loop systems with the controller $K_{rcid}$ match the ideal closed-loop system very well, while there are significant deviations for the systems with the controllers $K_{oe}$ and $K_{asym}$.

The above discussion and comparison of the method 1400 with the standard OE and ASYM methods illustrate the intuitively expected differences among these methods in a single example. To provide a fair comparison, multiple cases and realizations of exogenous disturbances and multiple systems can be considered. The following describes the effect of multiple realizations of input and output disturbances using Monte Carlo simulations. The use of input disturbances to model perturbations is very common, especially in the process industry, describing the system output as $y = G_0(s)(u+d)$. The typical sources of input disturbance come from actuator uncertainty and/or nonlinearity, such as valve hysteresis and valve stiction.

Here, multiple simulations (such as 100) with different realizations of input disturbances and output disturbances can be run. In each simulation, the excitation input signal u and disturbance signal d can be generated randomly as described above. For output disturbances, $$G_d(s) = \frac{50}{1000s + 1}$$

is used. For input disturbances, an additional white noise signal N(0,0.01) is added to the output as measurement noise. The weighting function is fixed as $W(s)=0.1/s$, and second-order models are identified using the four methods (OE, ASYM, BJ, and RCID). In the BJ method, a fourth-order noise model structure is used so that it has enough flexibility to model the noise. The v-gap between the weighted identified lower-order model (denoted by $G_{id}$) and weighted true process model is calculated for each simulation. The adjusted stability margin, defined as $\epsilon_{max}(WG_{id}) - \delta_v(WG_0, WG_{id})$, is also calculated. The value of $\epsilon_{max}(WG_{id})$ should be greater than the value of $\delta_v(WG_0, WG_{id})$ to help guarantee controller stability in the presence of model mismatch. Larger values of $\epsilon_{max}(WG_{id}) - \delta_v(WG_0, WG_{id})$ yield smaller values of $\phi$ in Equation (71), implying in turn smaller values for the closed-loop deviation from the ideal case $\|H(WG_{id}, K_{opt}) - H(WG_0, K_{opt})\|_\infty$. The v-gap and the adjusted stability margin of different identified models for each simulation run are plotted in FIGS. 21 and 22, respectively. In each subplot in FIGS. 21 and 22, the y-axis is the weighted v-gap, and the x-axis is the adjusted stability margin. Note that FIGS. 21(a) through 21(c) use the same scale, while FIG. 21(d) uses a larger scale due to inconsistent identification results. The smaller square in FIG. 21(d) corresponds to the full scale used in FIGS. 21(a) through 21(c). The desired values are in the lower-right corner of each subplot (where smaller v-gap and bigger adjusted stability margins are located), so the better algorithms may tend to cluster their results around that corner. The statistical results are also summarized in Table 2 (input disturbances) and Table 3 (output disturbances).

TABLE 2

| Method | $\delta_v(WG_{id}, WG_0)$ | | $\epsilon_{max} - \delta_v$ | |
|---|---|---|---|---|
| | Mean | Std | Mean | Std |
| RCID | 0.09374 | 0.01385 | 0.2342 | 0.01346 |
| ASYM | 0.1267 | 0.0231 | 0.2077 | 0.0277 |
| BJ | 0.7206 | 0.3785 | −0.3376 | 0.4031 |
| OE | 0.1250 | 0.0204 | 0.1877 | 0.0185 |

TABLE 3

| Method | $\delta_v(WG_{id}, WG_0)$ | | $\epsilon_{max} - \delta_v$ | |
|---|---|---|---|---|
| | Mean | Std | Mean | Std |
| RCID | 0.1129 | 0.02536 | 0.2107 | 0.02977 |
| ASYM | 0.2161 | 0.03502 | 0.1188 | 0.04112 |
| BJ | 0.2334 | 0.06915 | 0.1146 | 0.06409 |
| OE | 0.1522 | 0.05657 | 0.1588 | 0.05722 |

One general observation from this limited Monte Carlo study is that, in both input and output disturbance cases, the RCID method gives the smallest average v-gap and the biggest adjusted stability margin. The RCID method also gives the smallest variance in both values, indicating more consistent estimation results. It can also be noted that the BJ method is the PEM method with the most flexible model structure, yet in both cases the BJ method gives the worst results, often due to numerical optimization difficulties. In the input disturbance simulation, the BJ method fails to find a second-order model that a stable controller can be designed on for the majority cases. The RCID method therefore provides robust control-oriented system identification based on a higher-order model reduction approach with an objective of minimizing the weighted coprime factor uncertainty. The controller objectives can be truly integrated into the system identification step, and these simulation examples for SISO systems illustrate the application of the method and yield encouraging results in terms of the closed-loop behavior.

Although FIGS. 14 through 22 illustrate one example of another method for system identification and loop-shaping controller design, various changes may be made to FIGS. 14 through 22. For example, while shown as a series of steps, various steps in FIG. 14 could overlap, occur in parallel, occur multiple times, or occur in a different order. Also, the graphs shown in FIGS. 15 through 22 are for illustration only. In addition, various equations and other details have been provided above regarding the operation or validation of the method 1400. These details are for illustration and explanation only, and other embodiments of the method 1400 could be used that depart from these details.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (PAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "obtain" and its derivatives refer to any acquisition of data or other tangible or intangible item, whether acquired from an external source or internally (such as through internal generation of the item). The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. For example, while the above techniques have been described with respect to SISO systems, the techniques could be expanded for use with other types of systems (such as multiple input, multiple output or "MIMO" systems). Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining, by a processor, a preliminary model associated with a system to be controlled;
constructing, by the processor, a weighted model using one or more weighting factors;
identifying, by the processor, a final model of the system using the preliminary and weighted models, the final model having a stability margin that is greater than an uncertainty associated with the final model, wherein identifying the final model comprises:
determining a coprime factorization of the preliminary model and a normalized coprime factorization of the weighted model;
determining an error using input data to the system, output data from the system, and the coprime factorizations; and
determining frequency content of the input data, the output data, and the error; and
controlling the system using a controller designed based on the final model.

2. The method of claim 1, wherein identifying the final model further comprises:
determining one or more parameters associated with the final model using the coprime factorizations, the one or more parameters determined so that the final model has a reduced weighted coprime uncertainty.

3. The method of claim 2, wherein determining the one or more parameters comprises minimizing a maximum power spectrum of a time-domain signal in a frequency interval over multiple intervals.

4. The method of claim 3, wherein a power spectrum of the time-domain signal is estimated using a bank of bandpass filters.

5. The method of claim 4, wherein:
determining the one or more parameters comprises solving a linear matrix inequality problem iteratively, each of multiple iterations comprising identifying the one or more parameters of the final model, each iteration associated with a weighted coprime uncertainty value determined using the bank of bandpass filters; and
the iterations stop when a difference between the weighted coprime uncertainty values for two consecutive iterations is within a threshold value.

6. The method of claim 1, further comprising:
receiving data identifying one or more inputs to the system and one or more outputs from the system, the data used to identify the models; and
designing the controller by performing loop-shaping controller design.

7. An apparatus comprising:
a memory configured to store data associated with a system to be controlled; and
a processor configured to:
obtain a preliminary model associated with the system;
construct a weighted model using one or more weighting factors;
identify a final model of the system using the preliminary and weighted models, the final model having a stability margin that is greater than an uncertainty associated with the final model, wherein the processor is configured to identify the final model by:
determining a coprime factorization of the preliminary model and a normalized coprime factorization of the weighted model;
determining an error using input data to the system, output data from the system, and the coprime factorizations; and
determining frequency content of the input data, the output data, and the error; and
design a controller for controlling the system based on the final model.

8. The apparatus of claim 7, wherein the processor is configured to identify the final model further by:
determining one or more parameters associated with the final model using the coprime factorizations, the one or more parameters determined so that the final model has a reduced weighted coprime uncertainty.

9. The apparatus of claim 8, wherein the processor is configured to determine the one or more parameters by minimizing a maximum power spectrum of a time-domain signal in a frequency interval over multiple intervals.

10. The apparatus of claim 9, wherein a power spectrum of the time-domain signal is estimated using a bank of bandpass filters.

11. The apparatus of claim 10, wherein:
the processor is configured to determine the one or more parameters by solving a linear matrix inequality problem iteratively, the one or more parameters of the final model identified in each of multiple iterations, each iteration associated with a weighted coprime uncertainty value determined using the bank of bandpass filters; and the iterations stop when a difference between the weighted coprime uncertainty values for two consecutive iterations is within a threshold value.

12. The apparatus of claim 7, wherein:

the data comprises data identifying one or more inputs to the system and one or more outputs from the system; and the processor is configured to design the controller by performing loop-shaping controller design.

13. A method comprising:

identifying, by a processor, a first model associated with a system to be controlled;

performing, by the processor, model order reduction to identify a second model, wherein performing the model order reduction comprises:

constructing a weighted model using one or more weighting factors;

identifying the second model using the first model and the weighted model, the second model having a lower order than the first model;

reducing a frequency-weighted open-loop distance between the first and second models; and reducing a weighted coprime factor model uncertainty between the first and second models; and controlling the system using a controller designed based on the second model.

14. The method of claim 13, wherein performing the model order reduction comprises minimizing the weighted coprime factor model uncertainty between the first and second models.

15. The method of claim 13, wherein performing the model order reduction further comprises:

determining that the second model has a stability margin that is greater than an uncertainty associated with the second model.

16. The method of claim 15, further comprising:

identifying the one or more weighting factors.

17. The method of claim 16, wherein identifying the one or more weighting factors comprises:

selecting one or more values for one or more tunable parameters in each weighting factor, the one or more values selected to satisfy both controller performance and controller robustness requirements.

18. The method of claim 13, further comprising:

generating an input sequence for the first model and generating an output sequence based on the input sequence using the first model;

wherein the second model is identified using the input sequence and the output sequence.

19. The method of claim 13, wherein identifying the first model comprises identifying an auto-regression with exogenous input (ARX) model.

20. An apparatus comprising:

a memory configured to store data associated with a system to be controlled; and a processor configured to:

identify a first model associated with the system;

perform model order reduction to identify a second model by:

constructing a weighted model using one or more weighting factors;

identifying the second model using the first model and the weighted model, the second model having a lower order than the first model, the second model having a smaller weighted coprime factor model uncertainty than the first model; and reducing a frequency-weighted open-loop distance between the first and second models; and design a controller for controlling the system based on the second model.

21. The apparatus of claim 20, wherein the processor is configured to perform the model order reduction further by:

determining that the second model has a stability margin that is greater than an uncertainty associated with the second model.

* * * * *